(12) United States Patent
Tang et al.

(10) Patent No.: US 7,936,279 B2
(45) Date of Patent: May 3, 2011

(54) APPARATUS AND METHOD OF ILLUMINATING INDICATOR LIGHTS

(75) Inventors: Arnold Tang, Anaheim, CA (US); Wilbur Gordon Fehrmann, Jr., Bel Air, MD (US)

(73) Assignee: Lex Products Corp., Stamford, CT (US)

( * ) Notice: Subject to any disclaimer, the term of this patent is extended or adjusted under 35 U.S.C. 154(b) by 309 days.

(21) Appl. No.: 12/121,114

(22) Filed: May 15, 2008

(65) Prior Publication Data

US 2009/0284385 A1 Nov. 19, 2009

(51) Int. Cl.
*G08B 5/00* (2006.01)
(52) U.S. Cl. ............ 340/815.42; 340/815.4; 340/332
(58) Field of Classification Search .......... 340/332, 340/815.4, 815.42
See application file for complete search history.

(56) References Cited

U.S. PATENT DOCUMENTS

| | | | |
|---|---|---|---|
| 4,320,394 A * | 3/1982 | John, Jr. .............. | 340/618 |
| 4,456,903 A * | 6/1984 | Kishi et al. ............ | 307/10.1 |
| 5,051,578 A * | 9/1991 | Slemon et al. ......... | 250/227.23 |
| 5,268,634 A * | 12/1993 | Batcher ............... | 324/96 |
| 5,938,324 A | 8/1999 | Salmon et al. | |
| 6,552,888 B2 * | 4/2003 | Weinberger ............ | 361/57 |
| 7,498,950 B1 * | 3/2009 | Ertas et al. ........... | 340/679 |
| 2009/0051558 A1 * | 2/2009 | Dorval ................ | 340/653 |

OTHER PUBLICATIONS

Lumex, Single Unit Paten Mount Flexible Light Transporter, Blue Lens, technical drawing, Jan. 24, 2007, 1 page, Lumex, Palatine, IL, USA.
Dialight Corporation, Dialight 515 Series 2mm Round MicroLED Optopipe Optical Light Pipe, 2 Array, product brochure, website printouts show 2005 copyright date, downloaded on Dec. 1, 2010 from web.archive.org (http://web.archive.org/web/20061022042032/www.dialight.com/pdf/CircuitBoardIndicators/MDEG515X001_B-W.pdf) showing Oct. 22, 2006 date, 5 pages, Dialight Corp, USA.

* cited by examiner

*Primary Examiner* — Travis R Hunnings
(74) *Attorney, Agent, or Firm* — Knobbe, Martens, Olson & Bear LLP

(57) ABSTRACT

Embodiments include systems and methods of illuminating indicator lights. For example, one embodiment includes an apparatus for indicating status of an electrical device. The apparatus includes a housing configured to be attached to an electrical device, an electrical input disposed on the housing and configured to receive an electrical signal, a lighting element disposed in the housing and configured to output light in response to the electrical signal, and a first optical element disposed in the housing. The apparatus further includes a second optical element configured to be attached to a panel. The first optical element and the second optical element are positioned so that the first optical element is configured to transmit at least a portion of the output light to the second optical element and the second optical element is configured to output light received from the first optical element.

20 Claims, 21 Drawing Sheets

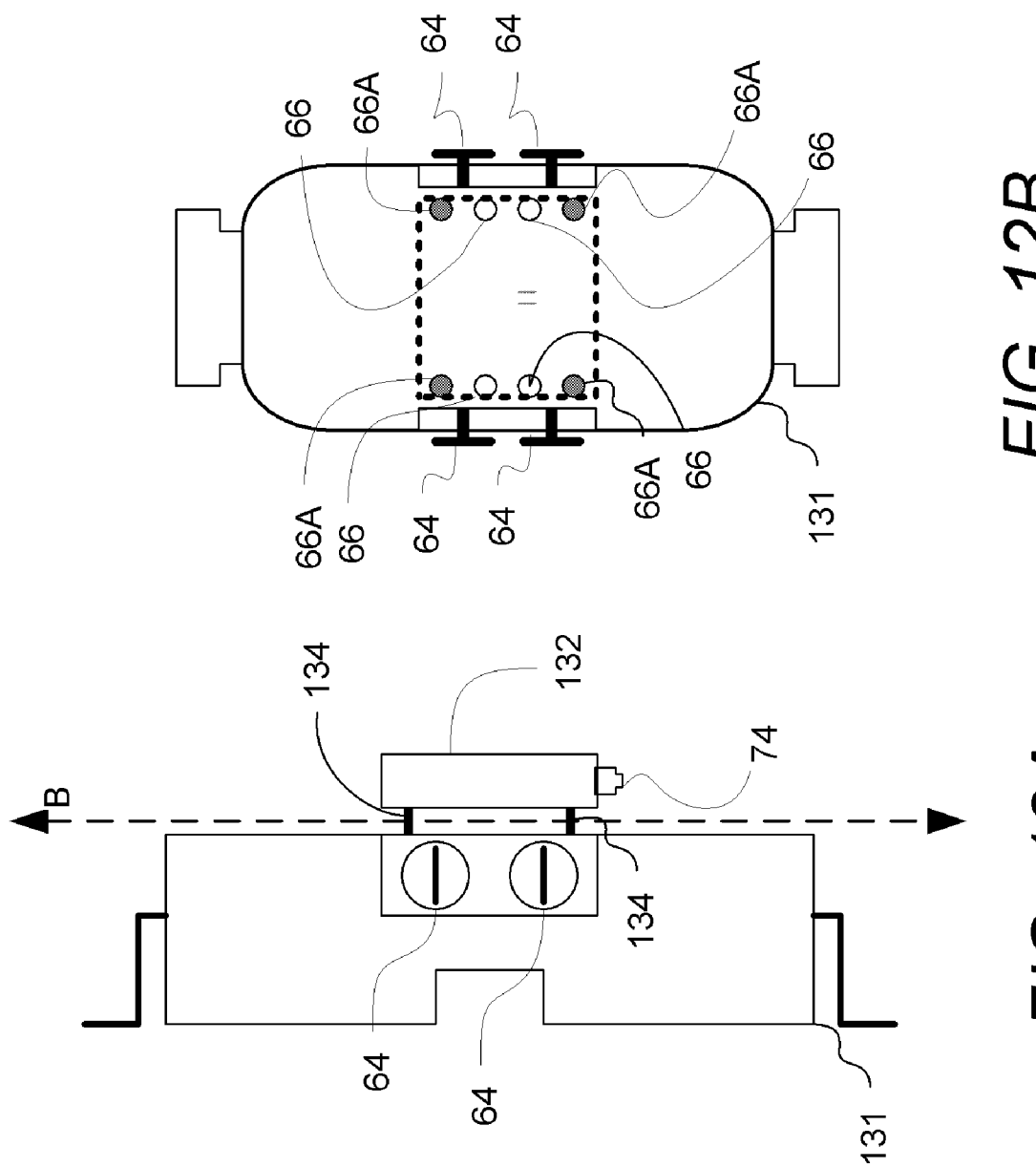

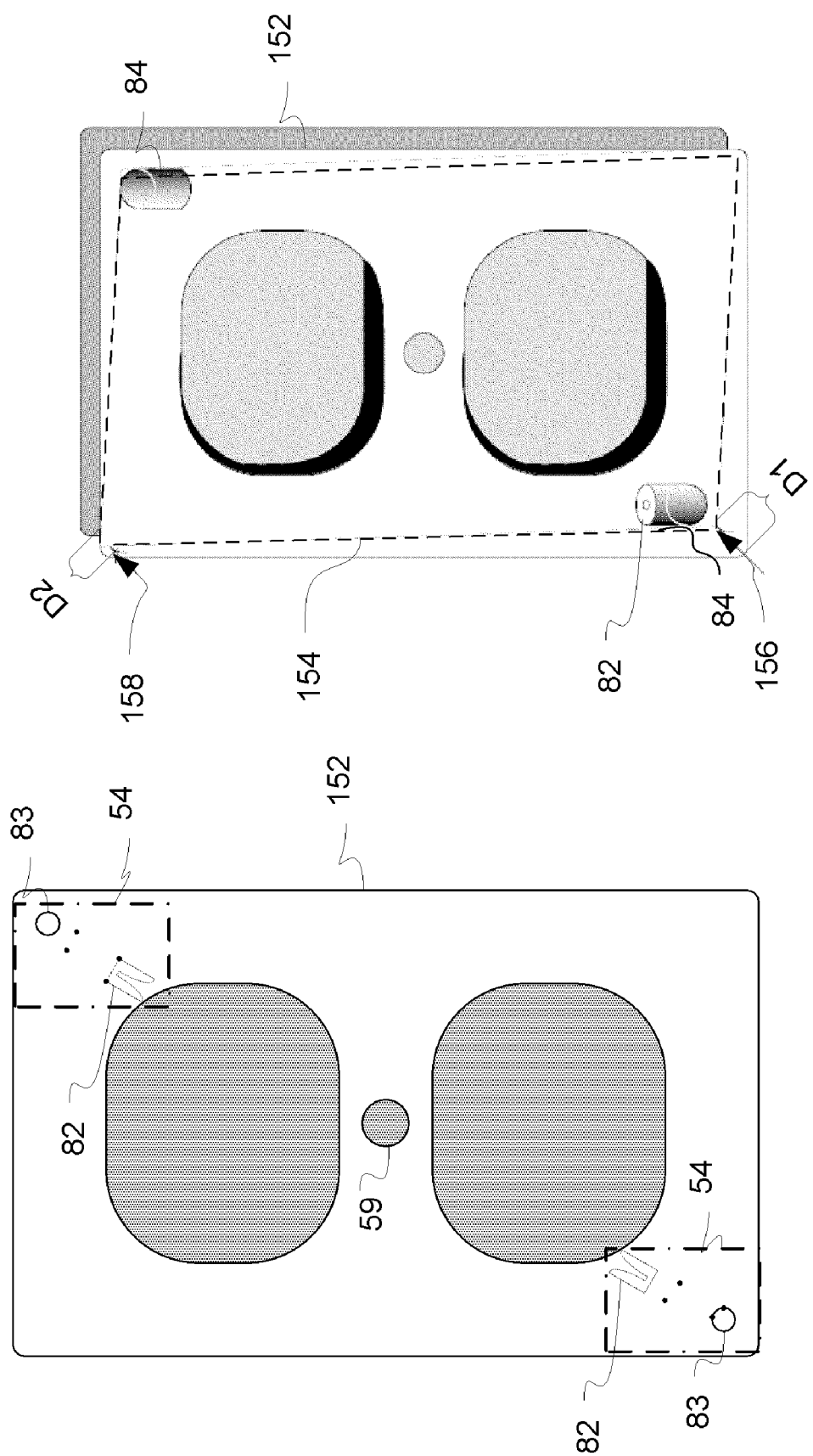

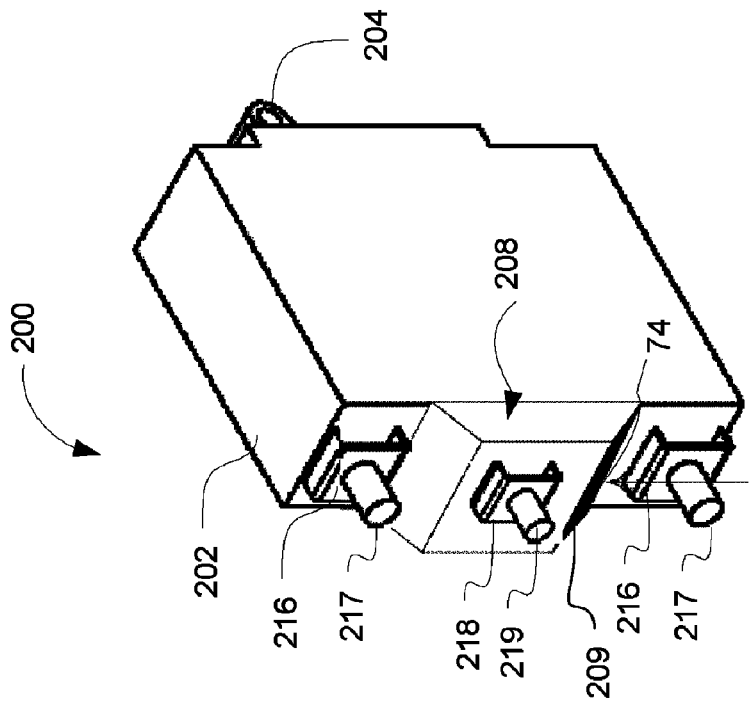
FIG. 16C
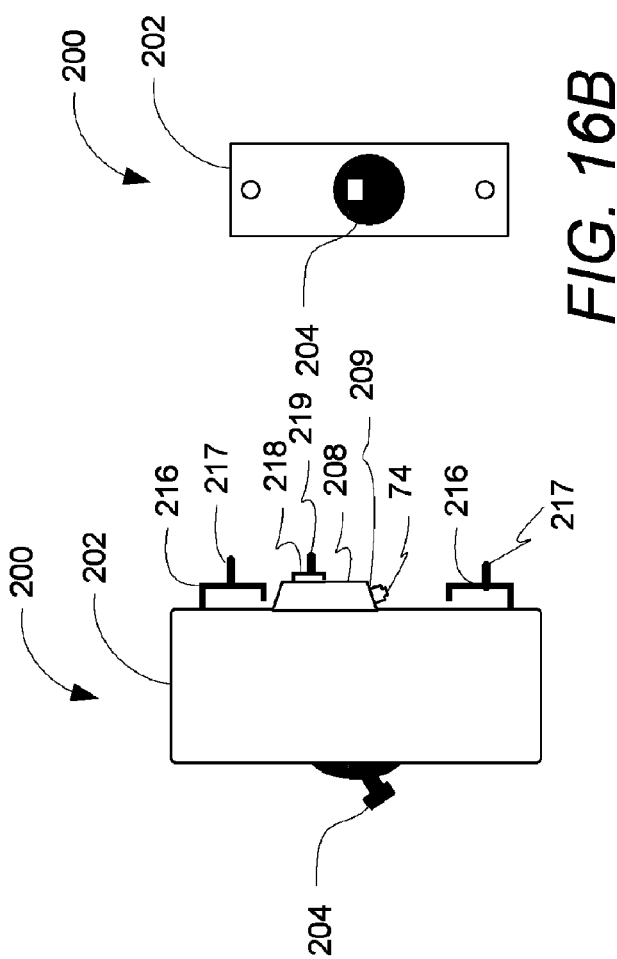
FIG. 16B
FIG. 16A

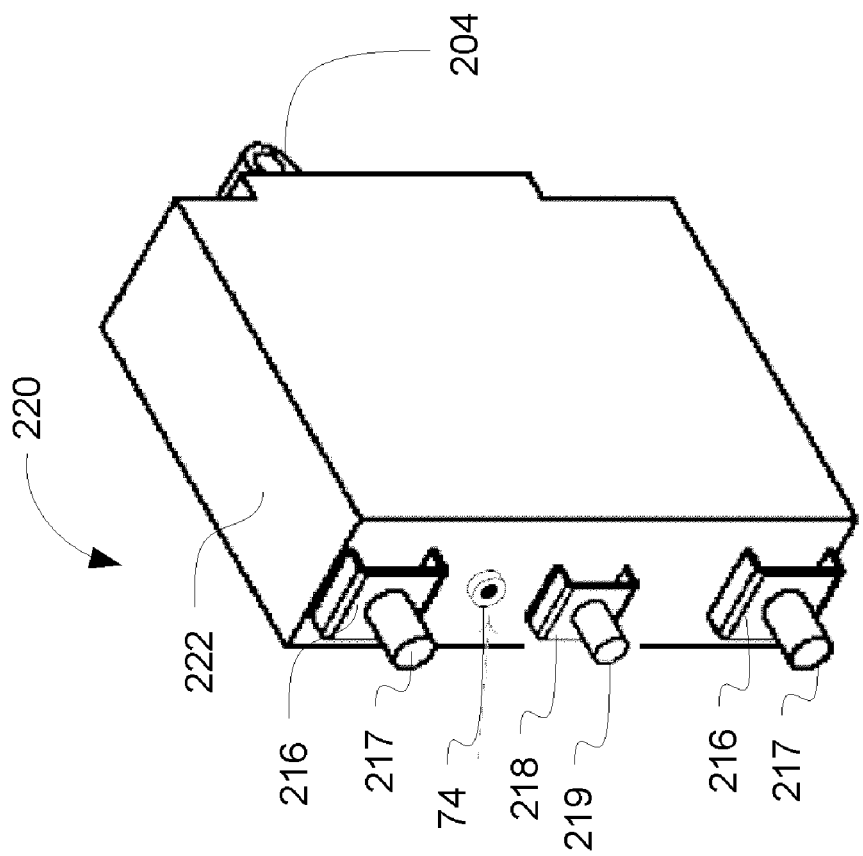
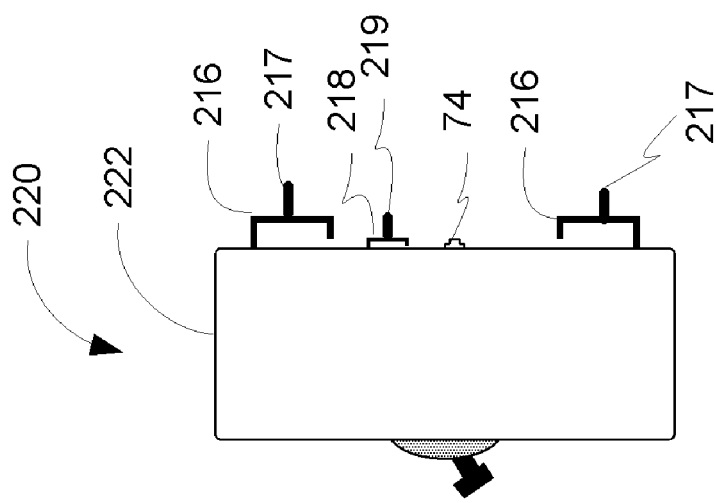
FIG. 17B
FIG. 17A

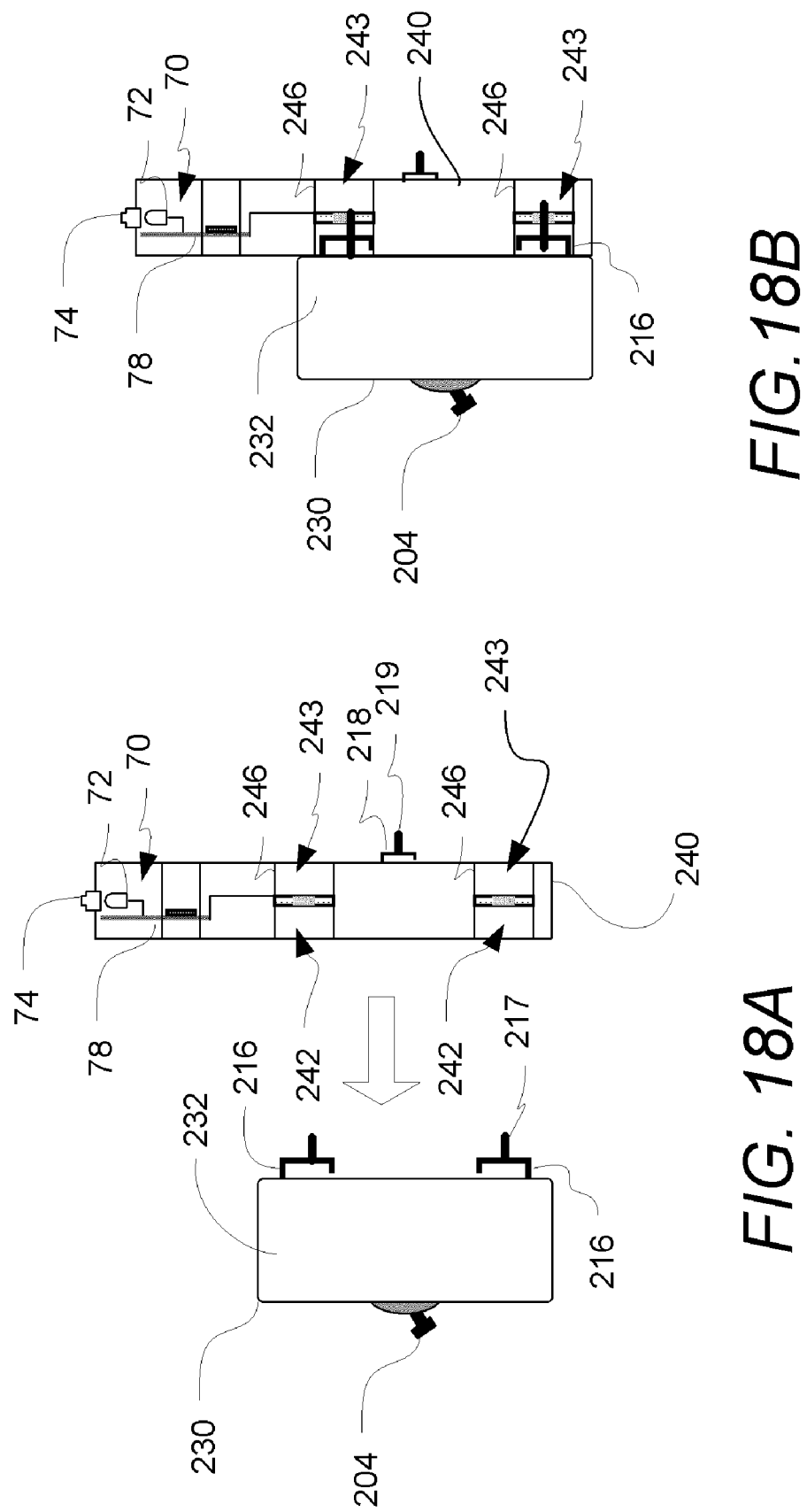

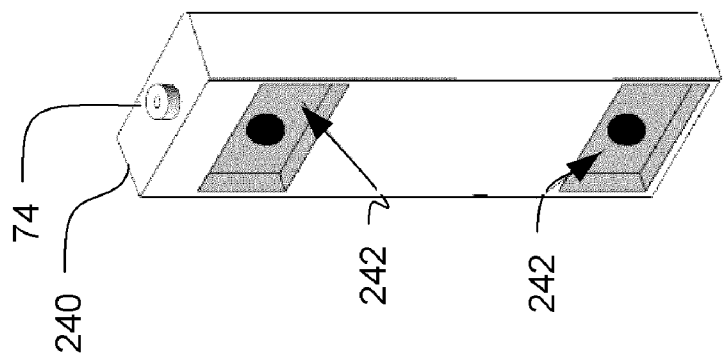
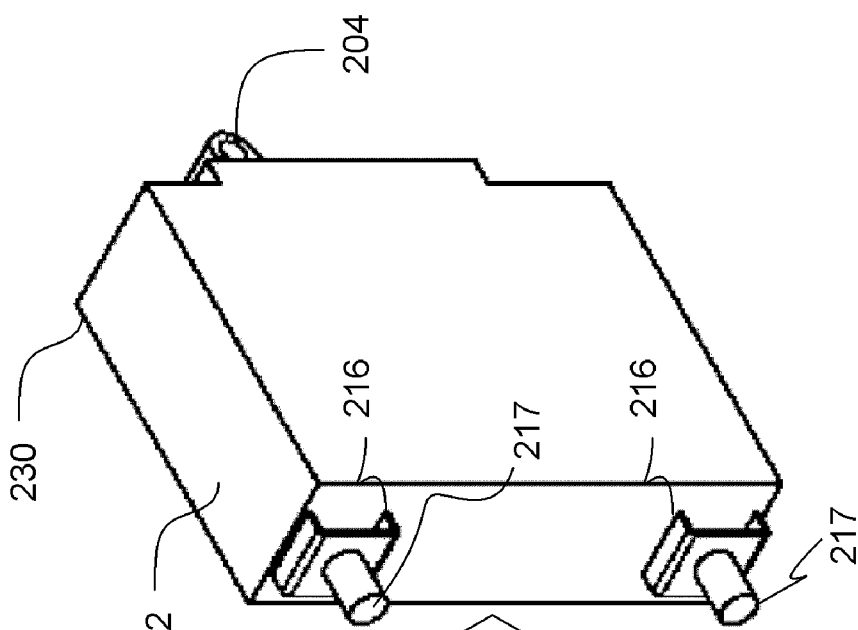
FIG. 19A
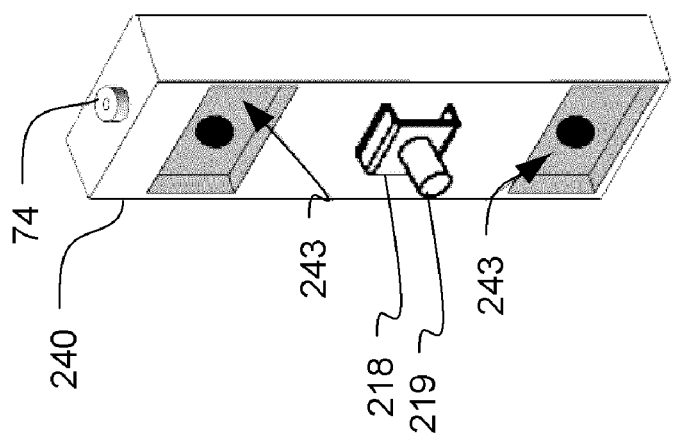
FIG. 19B

APPARATUS AND METHOD OF ILLUMINATING INDICATOR LIGHTS

BACKGROUND OF THE INVENTION

1. Field of the Invention

This application relates to apparatuses and methods for illumination of indicator lights such as in electrical devices.

2. Description of the Related Technology

Electrical circuit components and electrically powered devices often include light outputting devices that indicate status of power, operating, convenience, and safety functions of such components and devices. In many applications, the wiring to provide such indicators in a convenient location is messy, complex, and in some cases, increases the risk of short circuits or other electrical faults. Accordingly, a need exists for improved apparatuses and methods of providing such indicator lights.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include, for example, less expensive, more compact, and/or more reliable indicators in electrical components and devices.

One embodiment includes an apparatus for indicating status of an electrical device. The apparatus comprises a housing configured to be attached to an electrical device, an electrical input disposed on the housing and configured to receive an electrical signal, at least one connector disposed on the housing and configured to receive a proximal end of an optical fiber, at least one lighting element disposed in the housing and configured to output light in response to the electrical signal, and at least one optical element disposed in the housing and configured to transmit at least a portion of the output light to the optical fiber.

One embodiment includes an apparatus for indicating status of an electrical device. The apparatus comprises a housing configured to be attached to an electrical device, an electrical input disposed on the housing and configured to receive an electrical signal, a first connector disposed on the housing and configured to receive a proximal end of an optical fiber, a lighting element disposed in the housing and configured to output light in response to the electrical signal, a first optical element disposed in the housing and configured to transmit at least a portion of the output light to the optical fiber, a second connector configured to receive a distal end of the optical fiber, and a second optical element configured to be attached to a panel and configured to output light received from the optical fiber.

One embodiment includes an apparatus for providing an indicator, the apparatus includes a connector configured to receive an end of an optical fiber, an optical element attached to the connector and configured to output light received from the optical fiber, and a housing having the optical element disposed therein and configured to attach the apparatus to a panel.

One embodiment includes an apparatus for indicating status of an electrical device. The apparatus includes a housing configured to be attached to an electrical device, an electrical input disposed on the housing and configured to receive an electrical signal, a lighting element disposed in the housing and configured to output light in response to the electrical signal, a first optical element disposed in the housing, and a second optical element configured to be attached to a panel. The first optical element and the second optical element are positioned so that the first optical element is configured to transmit at least a portion of the output light to the second optical element and the second optical element is configured to output light received from the first optical element.

BRIEF DESCRIPTION OF THE DRAWINGS

FIG. 12A is a side view illustrating an embodiment that includes an off-the-shelf or standard receptacle that is connected to an attachable module housing an illuminator module.

FIG. 12B is a rear cutaway view of the receptacle illustrated by FIG. 12A.

FIG. 14A is a partial cutaway front view of another embodiment of an electrical cover for use with a receptacle such as illustrated in FIG. 1.

FIG. 14B is rear perspective view of the cover illustrated in FIG. 14A.

FIG. 16A is a side view of example of an electrical circuit breaker comprising an illuminator module.

FIG. 16B is a front view of the breaker illustrated in FIG. 16A.

FIG. 16C is a rear perspective view of a breaker such as illustrated in FIG. 16A.

FIG. 17A is a side view illustrating another embodiment of a breaker having a different fiber connector configuration.

FIG. 17B is a rear perspective view further illustrating a breaker such as illustrated in FIG. 17A.

FIGS. 18A and 18B is a side cutaway view of an example of an electrical breaker configured with an attachable indicator module.

FIGS. 19A and 19B are perspective views of the module and the breaker illustrated with reference to FIGS. 18A and 18B.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Electrical indicator lights are often used as indicators of the status of an electrical circuit or electrical circuit component. For example, indicators may be configured to identify the presence (or absence) of power to a circuit, the on-off status of switched circuit, the presence of electrical faults, or any other suitable type of electrical, mechanical, or electro-mechanical condition or status.

Electrical indicators include a lamp or other light generating device. Indicators may further include optical elements configured to filter, direct, reflect, or otherwise affect the color, brightness, directionality, and/or other optical characteristics of the indicator. Indicators may also include electrical or electronic components configured to generate a signal for the lamp based on particular electrical, mechanical, or electro-mechanical condition.

Electrical indicators may be attached to the corresponding electrical component. However, the electrical components may be located where associated indicators would be difficult, ineffective, or impossible to view. Thus, panel or cover mounted indicators may be desirable. Panel mounted indicators, however, can be costly and/or complicated to install due to the need to electrically wire the indicators to the electrical component. This cost and complexity may include labor costs and may require structural support members in the panel mounted indicators to be sufficiently large and sturdy enough to be able to support attached electrical connections. In addition, such electrical wiring may be difficult to wire, or be susceptible to creating short circuits. In addition, thinner wiring intended to be connected to the indicator may not be thick enough to easily attach to thicker circuit wiring using splices or twist connectors.

Figure 1:
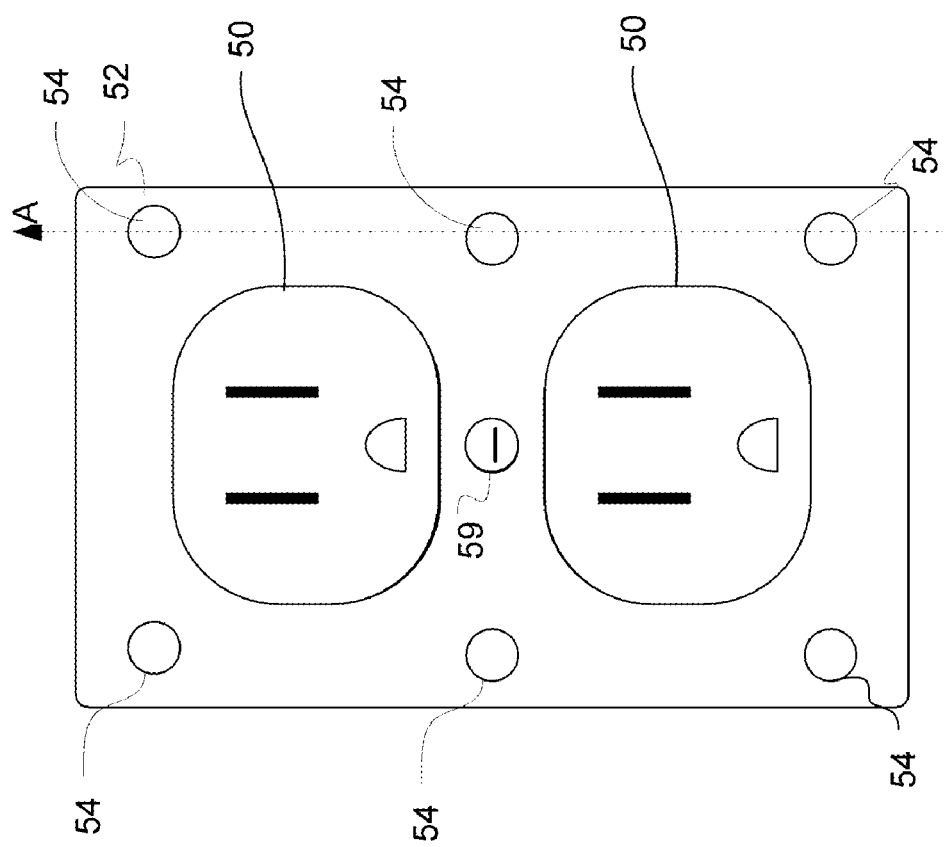
FIG. 1 is a front view of one embodiment of an electrical receptacle and cover plate.

One embodiment includes an indicator that desirably separates the electrical portion of the indicator, which may include an illuminator module comprising the lamp and electrical components, from the luminaire, which is affixed to a panel or other cover. In one embodiment, the indicator and luminaire are operationally coupled via an optical fiber that guides light from the lamp to the luminaire. The luminaire may thus be located in a convenient viewing location without use of electrical connections between the luminaire and the illuminator module. Various embodiments are disclosed herein that include electrical receptacles and electrical breakers. Other embodiments may also include electrical switches, dimmers, extension cords or panels, electronic or networking equipment FIG. 1 is a front view of one embodiment of an electrical receptacle 51 comprising two outlets 50, and an outlet panel or cover 52. An opening 59 in the cover 52 receives a screw or other fastener to affix the cover 52 to a housing (not shown) of the receptacle or outlet. The cover 52 comprises several luminaires 54 that provide an indicator of a state of an electrical connection such as of the electrical receptacle 51. In the illustrated embodiment, the luminaires 54 are connected via an optical fiber to an indicator module that is integrated into the receptacle 51. As discussed in more detail below with reference to FIGS. 8A-9D, the luminaires 54 may be integrally formed with the cover 52 or configured to be attached to the cover 52.

In the illustrated example, the luminaires are positioned at the corners and edge of the center of the cover 52. Because the luminaires 54 are coupled to a separate light generating indicator module via an optical fiber, different configurations of luminaires 54 may be used with a particular receptacle 51. Thus, in various embodiments, a selection of the covers 52 may be provided, e.g., in a kit, with luminaires 54 in different locations. Further, in one embodiment, the covers 52 comprise one or more punch-outs that may be removed and through which a luminaire 54 may be attached or affixed. Alternatively, the cover 52 may include one or more openings through which the luminaire 54 may be affixed. The location of the luminaires 54 may be selected based on particular applications.

The luminaires 54 may be integral with the panel or cover 52 associated with the electrical receptacle 51 or other electrical device. In addition, the luminaires 54 may be configured to be attached to the cover 52. For example, as noted above, the cover 52 may have one or more openings or punch-outs that can be removed to receive the luminaires 54. As discussed further with reference to FIGS. 9A to 9B below, the luminaire 54 may be attached to the cover 52 using a nut or other retaining ring or clip, a self retaining mechanism, a spring clip that is integral, or attachable to, the luminaire 54. In addition, adhesives or any other suitable fastener may be used to attach the luminaire 54 to the cover 52.

Figure 2:
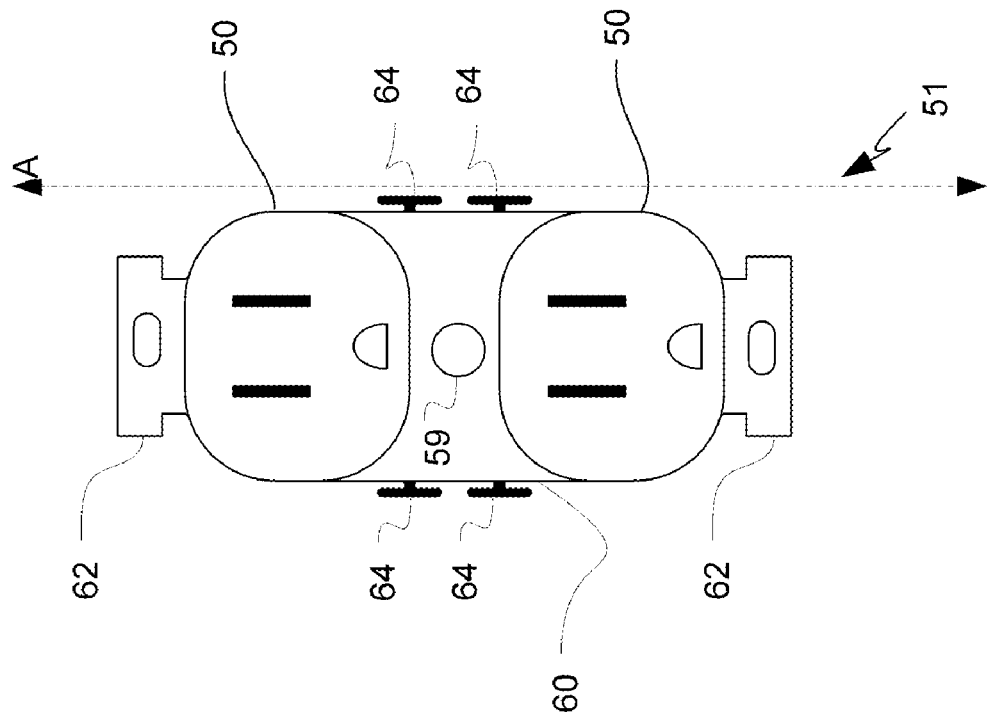
FIG. 2 is a front view of an example of the electrical receptacle illustrated in FIG. 1.

FIG. 2 is a front view of an example of the electrical receptacle 51 without the cover plate 52 attached. The electrical receptacle 51 comprises a housing 60 to which the outlets 50 and associated wiring (not shown) are attached. In one alternative embodiment, the housing 60 is integrally formed with the outlets 50. Attachment flanges 62 extend from the housing 60 and may be used to affix the receptacle 51 to a wall or other surface (not shown), with the receptacle 51 being received into an opening of such a surface. The receptacle 51 may also include screw-type terminals 64 for connecting the receptacle 51 to an electrical supply.

Figure 3B:
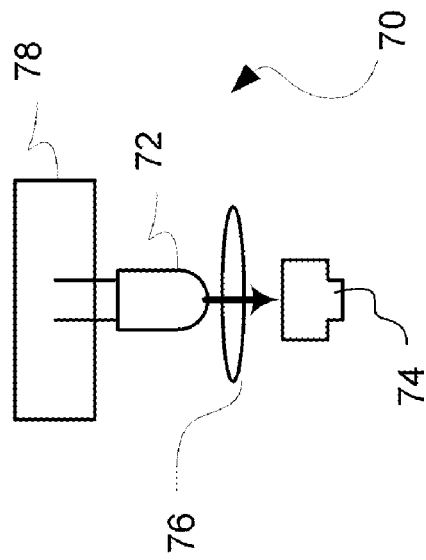
FIG. 3B is a schematic diagram of one embodiment of the illuminator module 70 such as included in the receptacle of FIG. 3A.
Figure 3A:
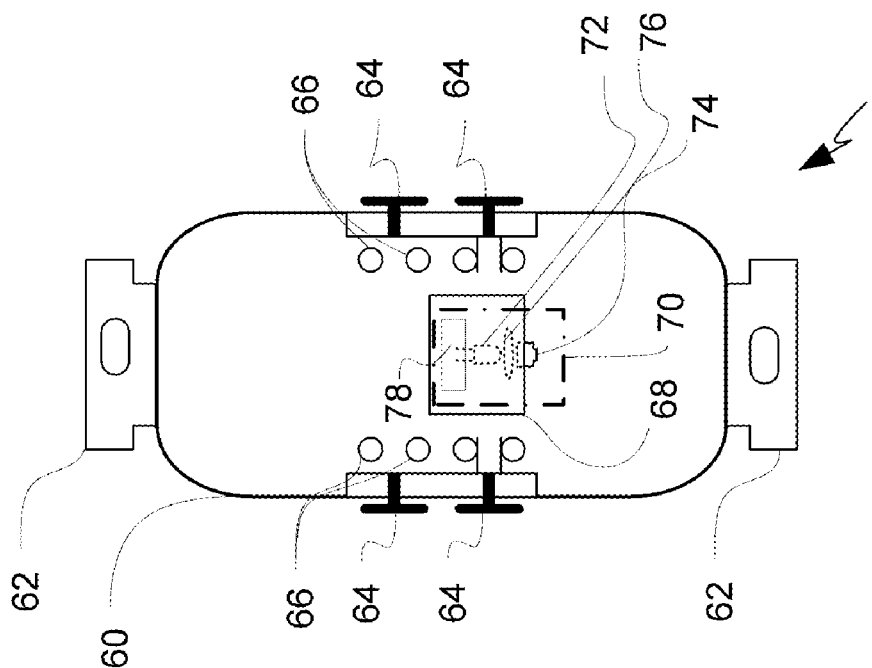
FIG. 3A is a rear view of the example of the electrical receptacle illustrated in FIG. 1.

FIG. 3A is a rear view of the example of the electrical receptacle 51 comprising the housing 60, additional, optional, push-in style electrical terminals 66, which may also or alternatively be used to connect the receptacle 51 to an electrical power supply, and a portion 68 of the housing 60 that has an illuminator module 70 disposed within. The electrical outlet housing 60 further includes electrical connections (not shown) between the electrical outlets 50 and the electrical connections 64. Depending on the embodiment, the illuminator module 70 may have electrical connections configured to connect one or both of the screw-in terminals 64 and/or the push-in terminals 66.

In the illustrated embodiment, the portion 68 of the housing 60 is located on the rear of the housing and comprises protrusion that extends from the housing 60 and has the illuminator module disposed within. However, in other embodiments, the portion 68 may be flush with the remainder of rear surface of the housing 60. The illustrated example of the illuminator module 70 comprises a lamp or other light generator 72 and a fiber connector 74 for receiving an optical fiber (not shown). The illuminator module 70 may further comprise an optical element 76 for interfacing the light from the light generator 72 with the connector 74 and electrical components 78 that provide an electrical signal to the light generator 72. The electrical components 78 are wired to the outlets 50 and/or the terminals 64 and 66. The electrical components 78 may comprise any suitable driving circuit for providing a drive signal to the particular light generators 72. The electrical signal may be indicative of the connection and electrical state of one or both of the outlets 50 or of the terminals 64 and 66. In the illustrated embodiment, the fiber connector 74 receives the optical fiber from below, e.g., generally parallel to the surface of the housing 60. In other embodiments, the fiber connector may be on the rear surface of the housing 60, e.g., facing away from the outlets 50.

FIG. 3B is a schematic diagram of one embodiment of the illuminator module 70. In this embodiment, the illuminator module 70 includes a single light generator 72 and a single fiber connector 74. In the embodiment illustrated in FIG. 3B, the illuminator module 70 includes one light generator 72. In other embodiments, the illuminator module 70 may include two or more light generators 72. In addition, while a single fiber connector 74 is illustrated in FIGS. 3A and 3B, embodiments may include two or more fiber connectors 74 optically coupled to one or more light indicators 72 by the optical element 76.

The light generator 72 may comprise any suitable light generating device including a light emitting diode (LED), an incandescent lamp, a discharge lamp such as a fluorescent tube, a cold-cathode tube, a neon or other gas-filled lamp, an electroluminescent composition or coating, or combinations thereof. The light generators 72 may be configured to vary the color (spectral) characteristics of the output light. In addition, frequency of output (e.g., to produce flashing lights) may also be varied, e.g., by the electrical components 78. As discussed further below, in one embodiment, the output light may be modulated according to a data modulation technique in order to transmit data regarding the status of the attached electrical device.

The optical element 76 guides the light to the connector 74 from the light source 72 and collimates, focuses, or otherwise affects optical coupling of the light to the connector 74 or optical fiber, filters (e.g., using an absorptive, luminescent, or interference filter to provide color, transmissive, reflective, or dichroic optical functions or to otherwise affect the spectral composition of the output light), or provides any other optical function on light within the illuminator module 70. In one embodiment, the optical element 76 is integrally formed with one or both of light source 72 and fiber connector 74.

In operation, the electrical components 78 provide an electrical signal to the light generator based on input electrical signals received via the electrical connections to the outlets 50 and/or the supply terminals 64 and 66. In one embodiment, the electrical signals comprise a drive current or voltage for activating the light generator when the electrical device is in a particular state, e.g., when one or both of the outlets 50 are powered, when a power drawing device is connected to one or both of the outlets 50, when a ground fault circuit interrupter (GFCI) associated with the outlet 50 is active or triggered, or any other suitable status or condition. The light generator 72 generates light that the connector 74 couples to an optical fiber.

Figure 4:
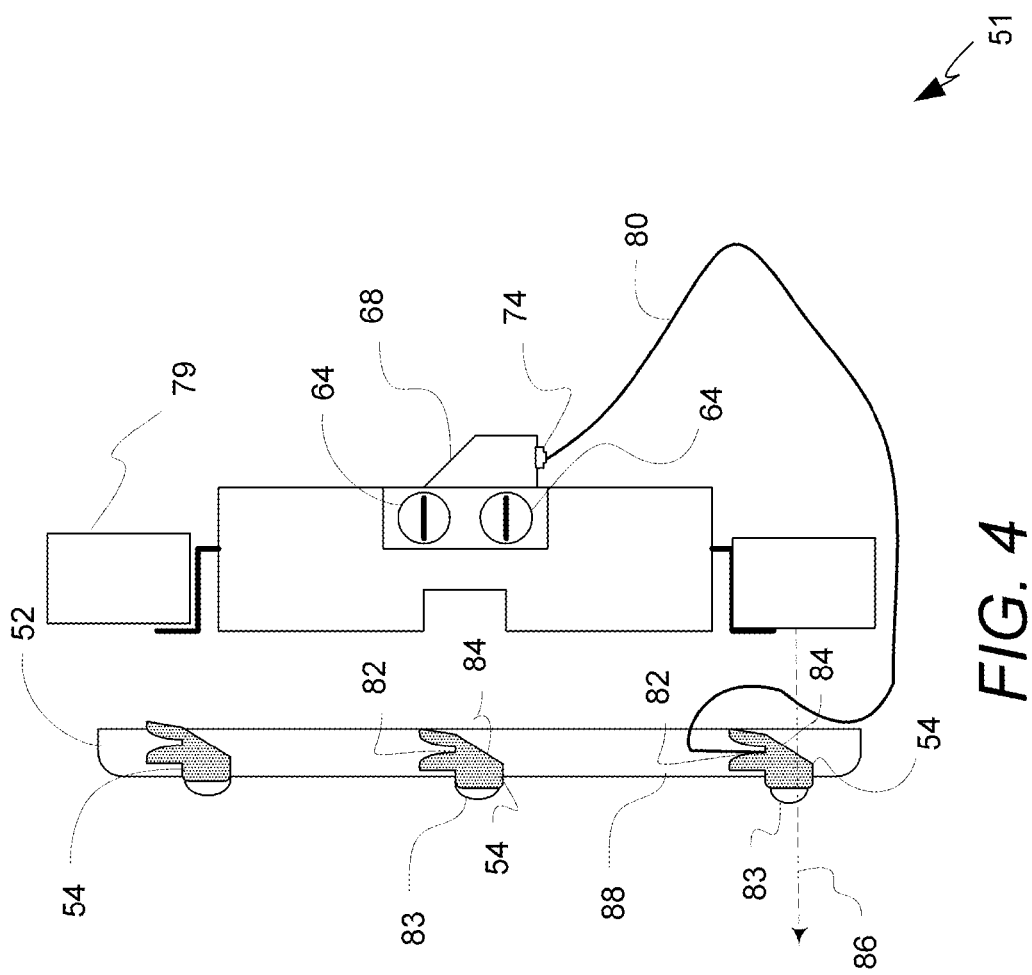
FIG. 4 is a side cross section view of the receptacle of FIG. 1 taken along line A illustrating a fiber connector of the receptacle, an optical fiber, and an luminaire in the cover of the receptacle.

FIG. 4 is a side cross section view of the receptacle 51 taken along line A of FIG. 1, through the luminaires 54 of the cover 52. In FIG. 4, the receptacle 51 is illustrated mounted on a wall 79. An optical fiber 80 connects to the optical fiber connector 74 of the illuminator module 70 and optically couples the illuminator module 70 with one of the luminaires 54. The luminaires 54 receives the fiber 80 via a fiber connector 82.

Figure 5:
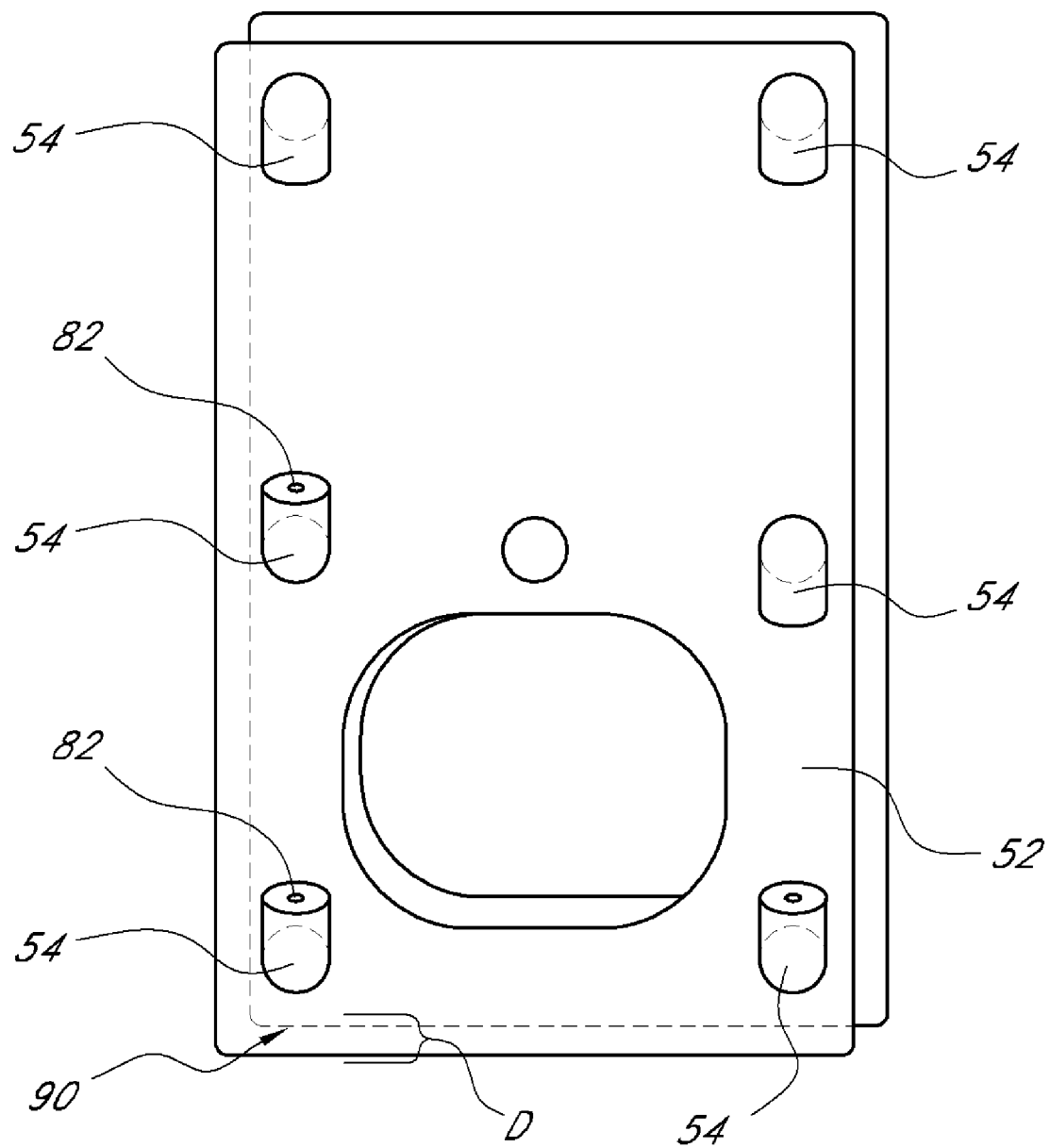
FIG. 5 is a rear perspective view illustrating another embodiment of a receptacle cover such as illustrated in FIG. 1.

The luminaire 54 includes an optical output element 83 that outputs light received from the optical fiber 80. Optionally, as illustrated in FIG. 4, the luminaire 54 may comprise a light guide 84 for directing light, e.g., via total internal reflectance, from the fiber connector 82 to the optical element 83. In the illustrated embodiment, the light guide 84 allows the fiber connector to be positioned at an angle of about 90° with an optical axis 86 of the optical element 83, i.e., substantially parallel to a surface 88 of the cover 52. In other embodiments, the fiber connector 82 may be positioned at an angle of between 10 and 80 degrees with respect to the optical axis 86 of the optical element 83. The angle of entry of the connectors 82 may be selected to allow access for affixing the optical fiber around the terminals FIG. 5 is a rear perspective view illustrating one embodiment of the cover 52. A rear surface of the cover 54 may curve the at the edges so that the cover 52 defines a cavity with a depth D to allow space for connecting the fiber 80 to the fiber connectors 82 when the cover 52 is installed proximal to the receptacle 51.

Figure 6A:
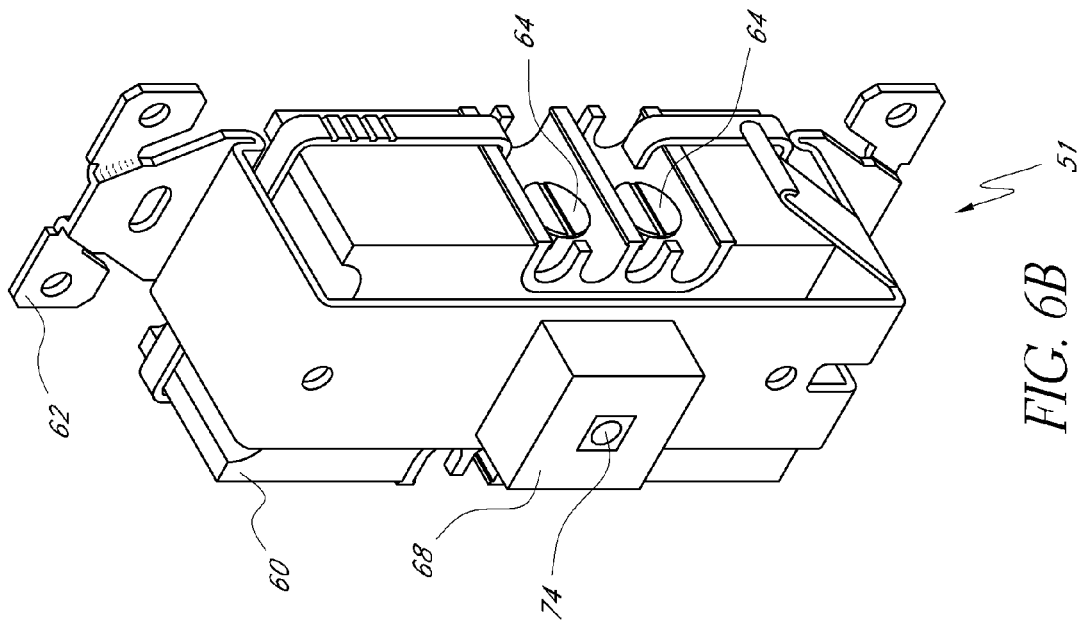
FIG. 6A is a rear perspective view of an embodiment of the receptacle of FIG. 1.

FIG. 6A is a rear perspective view further illustrating the protruding portion 68 of the housing 60 within which the illuminator module 70 (See FIG. 2) is disposed. The fiber connector 74 in this embodiment is located out of view on a bottom surface of the protruding portion 68.

Figure 6B:
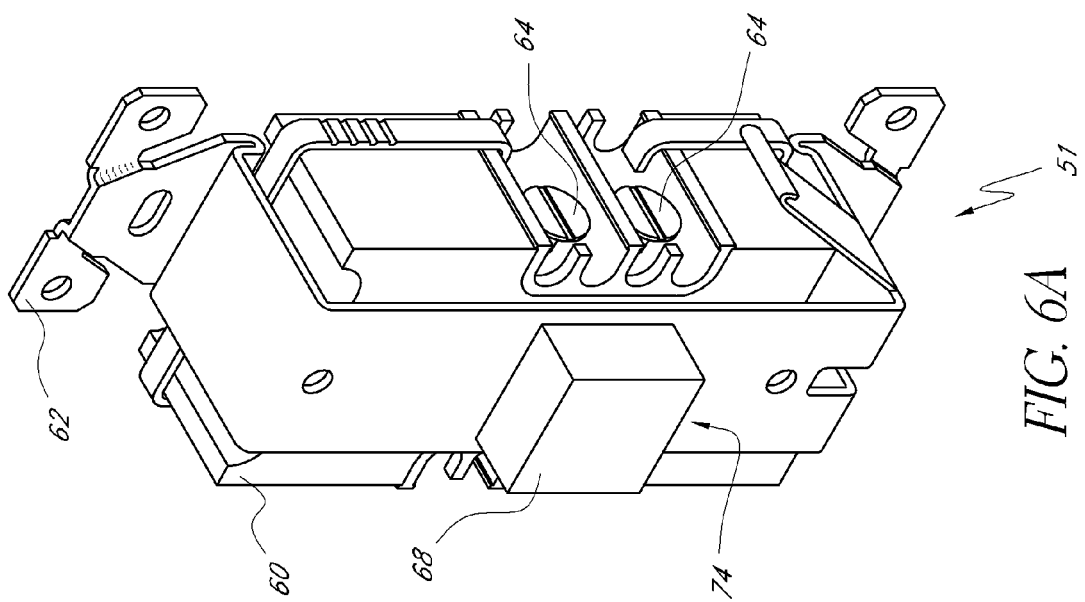
FIG. 6B is a rear perspective view further illustrating another embodiment of a receptacle such as illustrated in FIG. 1.

FIG. 6B is a rear perspective view further illustrating another embodiment of the receptacle 51. In the embodiment illustrated in FIG. 6B, the fiber connector 74 is located on a rear surface of the protruding portion 68.

Figure 7A:
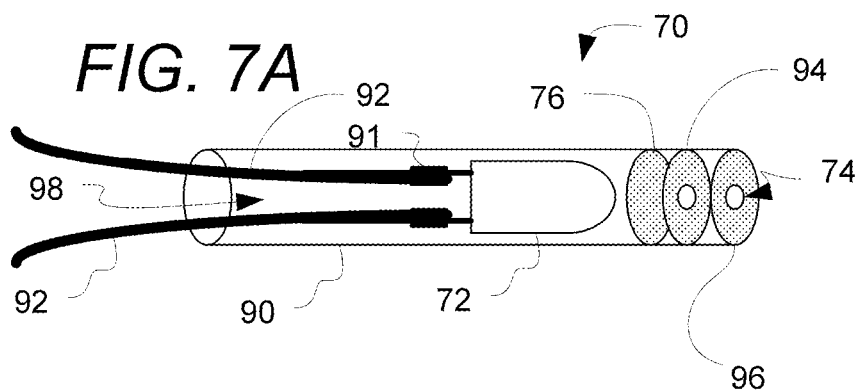
FIGS. 7A-G illustrate examples of illuminator modules such as included in embodiments of electrical devices disclosed herein.

FIG. 7A is a cutaway view of an example of the illuminator module 70. The illustrated example of the illuminator module 70 includes a housing 90 that has terminals 91 disposed therewithin. The terminals 91 are electrically connected via connecting wires 92 that extend from the housing 90 to the electrical components of the receptacle 51 or other type of electrical device. The housing 90 further has the light generator 72, the optical element 76 and the fiber connector 74 disposed therewithin. In the illustrated example, the fiber connector 74 comprises a fiber capture element 94, which may further perform one or more optical functions of the optical element 76. The optical fiber receiving end of the housing 90 further comprises an environmental seal 96 that surrounds and seals the optical fiber. The housing 90 may fully or partially provide an environmental seal to protect the electrical components of the module 70. For example, the housing 90 may comprise an electrical insulator and extend around the electrical terminals 91 so as to partially enclose the terminals 91 with an opening 98 for the connections 92 so that the terminals 91 are at least partially protected from electrical contact with other conductors within or around the receptacle 51. The partial enclosure of the housing also protects the connections 92 from mechanical damage that might short or damage the connections 92 in or about the terminals 91.

In one embodiment, the housing 90 may further provide a substantially water or airtight sear around the connectors 92 and the fiber connector 74 to protect the light generator and other components of the module 70 from environmental degradation.

Figure 7B:
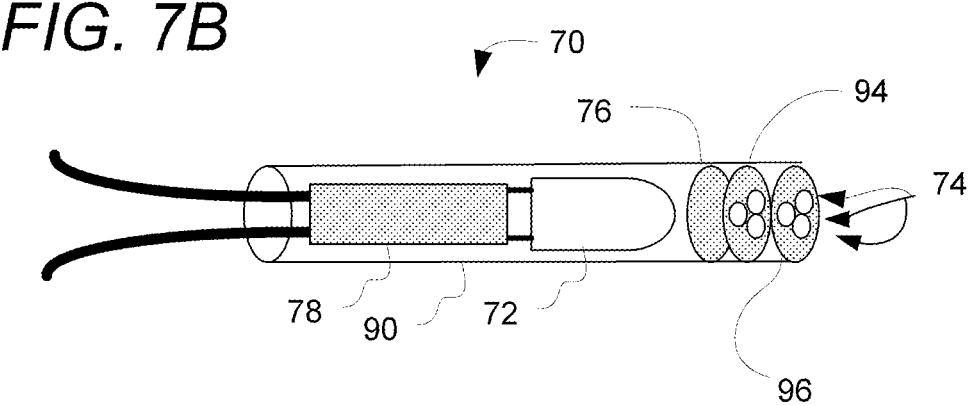

FIG. 7B is a cutaway view of another example of the illuminator module 70 that illustrates the electrical components 78 configured to drive the light generator 72. The illustrated example further includes multiple, e.g., three, fiber connector ports 74 so that this example of the module 70 can drive one to three luminaires 54 (not shown).

Figure 7C:
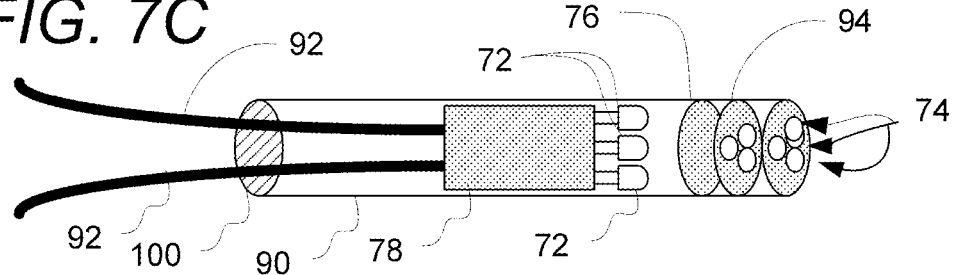

FIG. 7C is a cutaway view of another example of the illuminator module 70 that illustrates the electrical components 78 configured to drive multiple, e.g., three, light generators 72, which in turn output light to multiple, e.g., three fiber connectors 74. The illustrated example of the illuminator module 70 further includes a second environmental seal 100 to provide a substantially water and/or airtight seal to the housing 90.

Figure 7D:
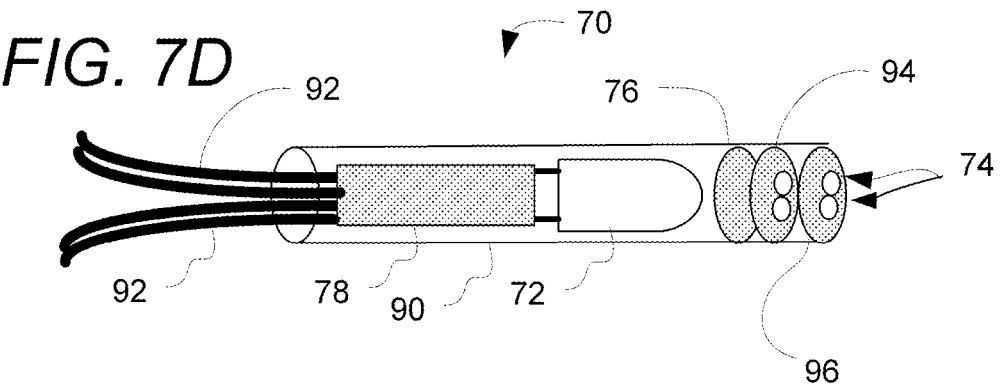

FIG. 7D is a cutaway view of another example of the illuminator module 70 that illustrates the electrical components 78 configured to drive multiple, e.g., two, light generators 72, which in turn output light to multiple, e.g., two fiber connectors 74. The illustrated example of the illuminator module 70 further includes a second environmental seal 100 to provide a substantially water and/or airtight seal to the housing 90. The example of the module 70 in FIG. 7D illustrates additional connectors 92 that may be used by the electrical components 78 to, for example, modulate the output light to indicate additional status data.

Embodiments of the indicator modules 70 and luminaires 54 disclosed herein may be further configured to communicate data regarding the status of the associated electrical systems to a computing device such as a system monitoring and/or control computer or to personal computing devices such as laptop computers, personal digital assistants, mobile telephones, or any other suitable electronic device. Desirably, such optical communication is resistant to electrical noise such as is found near electrical connection and supply systems.

For example, embodiments may be configured to measure and record electrical line and load data, and provide a way of transmitting and receiving electrical line and load data. Electrical power distribution exists throughout industrial, office, and residential applications. Traditionally, metering and measurement of the nature of electrical supplies (including but not limited to electrical voltage and frequency) and connected loads (including but not limited to current flow, power consumption, load factor, and load nonlinearity) is done at a central metering point for billing purposes. Such information may lack detail to be used for the purposes of optimizing electrical usage; information is required on a more detailed basis, and in heavy power-consuming industries, equipment is periodically monitored and inspected with special power measurement equipment to optimize electrical usage. Due to the expense and difficulty of incorporating such instrumentation into the electrical power distribution system, continuous measurement is often limited to a single floor or a single piece of equipment of sufficient return-on-investment. Desirably, according to one embodiment, suitable modules 70 such as illustrated with reference to FIGS. 7A-7D, and luminaires 54 may be used to communicate such usage data via optical data transmission protocols.

For example, the connectors 92 may be parallel-connected to line and load. Such modules 70, used for electrical power measurement devices, may be configured to be electrically inserted across the line and load to obtain parallel-measurable data (such as voltage and frequency), to be electrically in series between the line and load to obtain series-measurable data (such as current, power, power factor, and load linearity), or a combination of both. The electrical components 78 may include data memory for the retention of measurement data over time functionality (commonly referred to as data-logging).

Electrical measurement functions have been successfully integrated into extremely compact microelectronic devices. As an example, the ADE7100 and ADE7500 family of "energy meter integrated circuits" from Analog Devices, Inc. (of Norwood, Mass., United States of America) permit the measurement of five key electrical load parameters of single or three-phase electrical systems in a device measuring less than ½" square. Embodiments of the electrical components 78 may include such measurement devices.

In some embodiments, such as illustrated in FIG. 7D, optical data protocols may be provided by two optical interfaces, a transmitting interface that produces light for reception by another device, and a receiving interface that receives light produced by the referenced device. The indicator module 70 of FIG. 7D provides an example of multiple optical fiber connections 74 and multiple emitter devices; one fiber may be used for transmission, and another fiber from the same indicator device could be used for received light energy. The emitter devices of the indicator invention may be modified or optimized to work as receivers, or may be modified or optimized to receive two fibers and act as both a receiver and a transmitter so as to reduce illuminator installation costs to a single device.

The fiber optic connections to the indicator modules 70 may further be configured to permit daisy-chain connection among several indicator modules 70 prior to the connection to the luminaire 54 that presents the optical signal (and the incorporated data) to an external device. In one such embodiment, only the last module 70 in the daisy-chain would connect to a luminaire set or luminaire pair (transmission/reception). Any suitable data protocol may be used in such an embodiment communicate data from one module 70 to the next. The receiving module 70 decodes the data, then immediately reencodes and retransmits the data down the sequence of modules 70. Desirably, such a configuration would permit multiple modules 70 in a single electrical panel to communicate through a single luminaire set or luminaire-pair.

The optical communication protocol may include any suitable protocol such as standardized protocol including the IrDa protocol. Other suitable protocols may be utilized by embodiments including protocols based on visible-light, infrared-light, or a combination of both. Additionally, in one embodiment, the same luminaires 74 may serve simultaneously as a visible-light indicator to a human operator, and as a data-bearing device.

In one embodiment, the two separate luminaires (transmit and receive) and associated fiber may be combined, for example in embodiments in which separate luminaires are impractical or impossible. FIG. 7A illustrates one suitable configuration. Any suitable light communication protocol may be used such as those providing a combined of transmit and receive luminaire that uses multiple access techniques to share the luminaire between sending or receiving, e.g., carrier-sense multiple-access, carrier-detect multiple-access, time-domain multiple access, or any other suitable technique. A single luminaire 54 may also serve both transmit and receive functions for separate transmit and receive light-bearing fibers by combining two optically-isolated luminaires to fit into a single mounting hole.

Figure 7E:
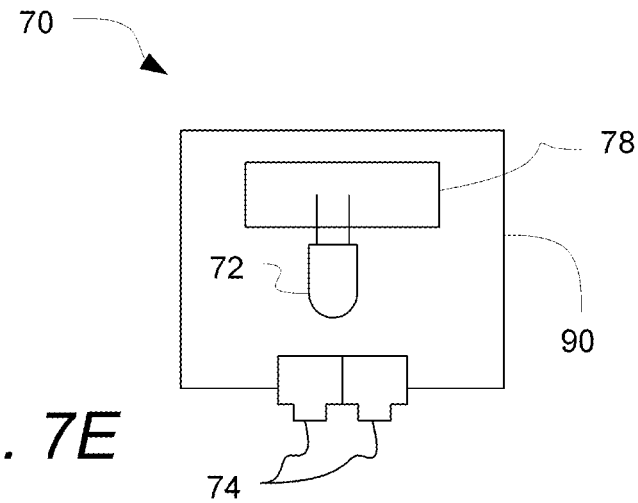

FIG. 7E is a cross section view of one embodiment of the illuminator module 70 that comprises a single light generator 72 optically coupled to two fiber connectors 74 for providing a signal to two luminaires via two optical fibers.

Figure 7F:
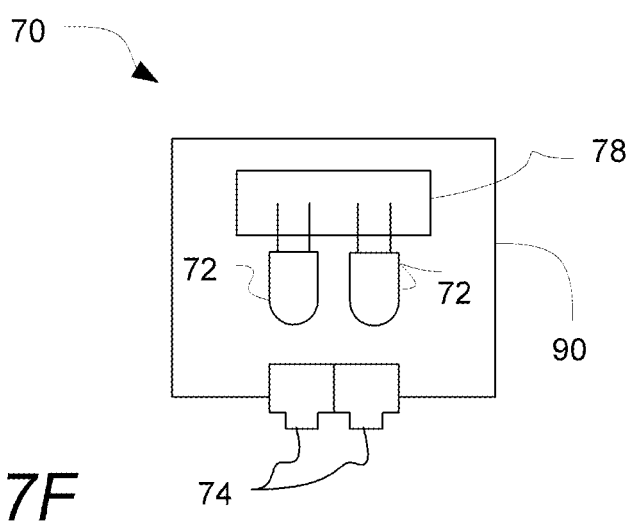

FIG. 7F is a cross section view of another embodiment of the illuminator module 70 that comprises two light generators 72 that are optically coupled to two fiber connectors 74 for providing a more complex optical signal to two luminaires via two optical fibers.

Figure 7G:
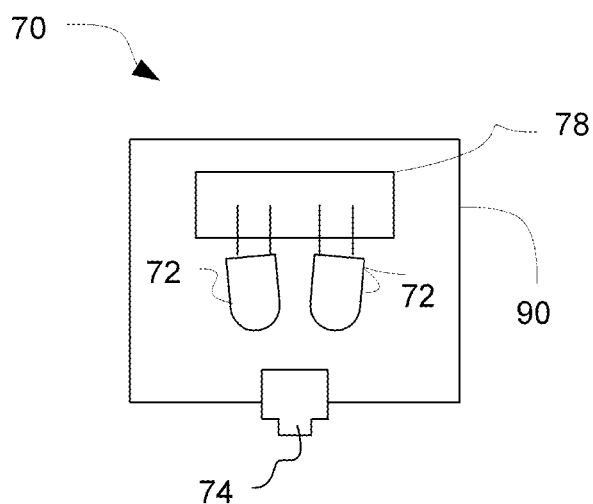

FIG. 7G is a cross section view of another embodiment of the illuminator module 70 that comprises two light generators 72 that are optically coupled to a single fiber connector 74 for providing a more complex optical, e.g., multicolor, signal to a single luminaires via a single optical fiber.

Figure 8A:
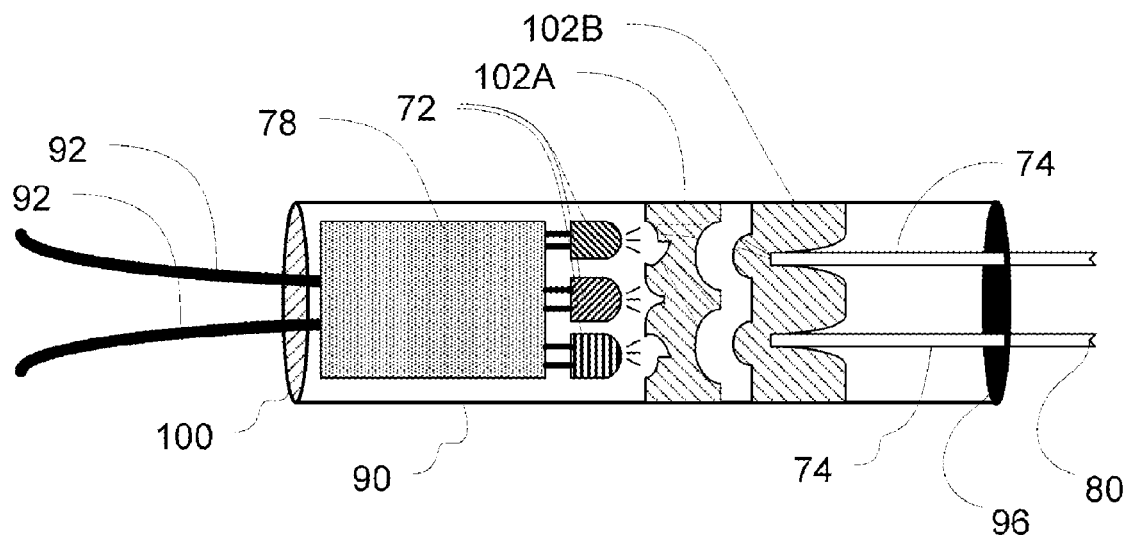
FIG. 8A-8B illustrate further examples of illuminator modules such as included in embodiments of electrical devices disclosed herein.

FIG. 8A is a cutaway view of another example of the illuminator module 70 in which the optical element 76 comprises lenticular optical elements 102A and 102B that combine light from multiple light generators 72 (which may each have different spectral or other properties) and provide that light to one or more of the fiber connectors 74. The optical element 102B further includes an integrated fiber capture feature to secure the optical fiber 80.

Figure 8B:
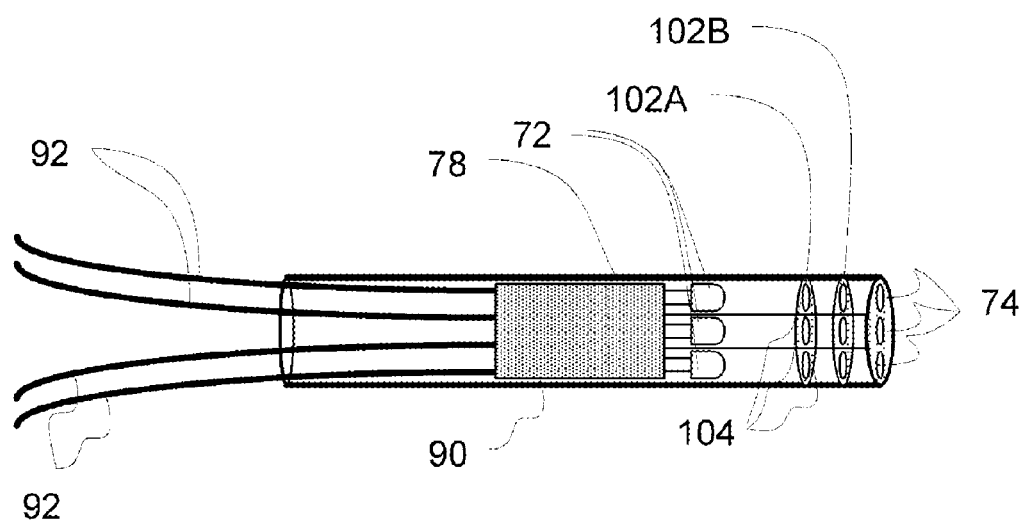

FIG. 8B is a cutaway view of another example of the illuminator module 70 in which the optical elements 102A and 102B further comprise separate lenses 104 or other optical components for each corresponding light source 72 so that each light source 72 independently outputs light to a particular fiber connector 74 (and thus different optical fiber is connected to each light source 72).

Figure 9B:
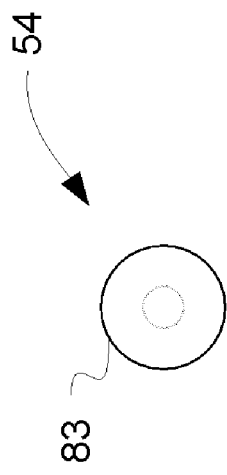
FIGS. 9A-9D illustrate examples of luminaires such as for use with the cover of FIG. 5, in or on an electrical panel, or in or on an electrical appliance enclosure.
Figure 9A:
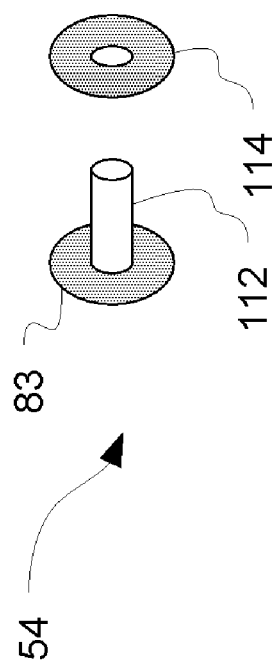

FIG. 9A is a perspective view of an example of the luminaire 54 such as illustrated in FIGS. 2B and 3 that is configured to be inserted into openings of the cover 52 (e.g., of FIG. 3). FIG. 9B is a front view of the example of the luminaire 54 of FIG. 9A illustrating the optical output element 83 with a generally circular shape. The example of the luminaire comprises the optical output element 83 for outputting light received from the optical fiber and a cylindrical body 112 that is configured to be received through an opening in an electrical cover or panel and affixed to the cover or panel via a retaining ring 114. In one embodiment, the body 112 and ring 114 include threads for screwing the ring 114 onto the body 112. In other embodiments, any suitable method and apparatus of affixing the ring 114 to the body 112 may be used such as adhesives, barbs, or press fitting.

Figure 9D:
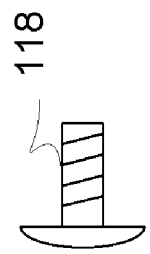
Figure 9C:
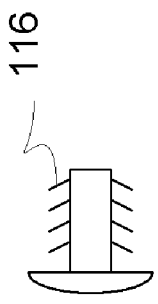

FIG. 9C is another example of the luminaire 54 illustrating an example of a self retention mechanism comprising hooks or barbs 116 configured to be inserted into an opening in the panel or cover 52 but which resist being removed due to the shape of the hooks or barbs resisting outward movement.

FIG. 9D is another example of the luminaire 54, illustrating another example of a self retention mechanism. In this example, the retention mechanism comprises threads 118 that are configured to be received by corresponding threads (not shown) in the panel or cover 52.

Figure 10A:
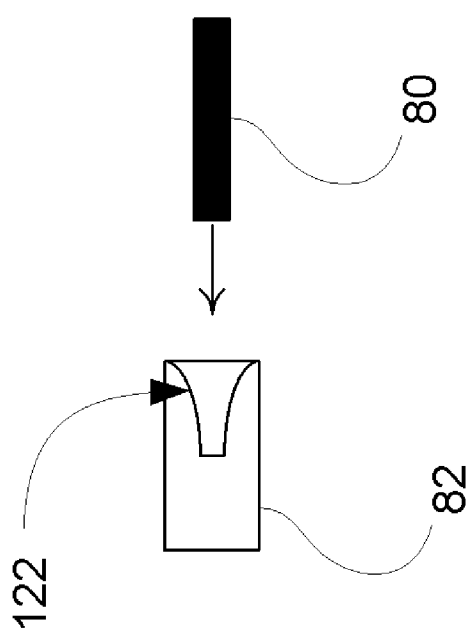
FIGS. 10A-10B illustrate examples of fiber connectors for use in the luminaires of FIGS. 9A-9D and in luminaires incorporated into cover plates such as illustrated in FIGS. 5, 11, 14, and 15.

FIG. 10A illustrates one example of the fiber connector 82 of the luminaire 54. The illustrated example of the fiber connector 82 includes a conical opening 122 that is larger in the distal end of the connector 82 than in the proximal end of the connector 82 so that the optical fiber 80 can be press received into the opening 122 and press fit into the connector 74. The fiber 80 may be further secured to the fiber connector 82 using an adhesive or other suitable mechanism.

Figure 10B:
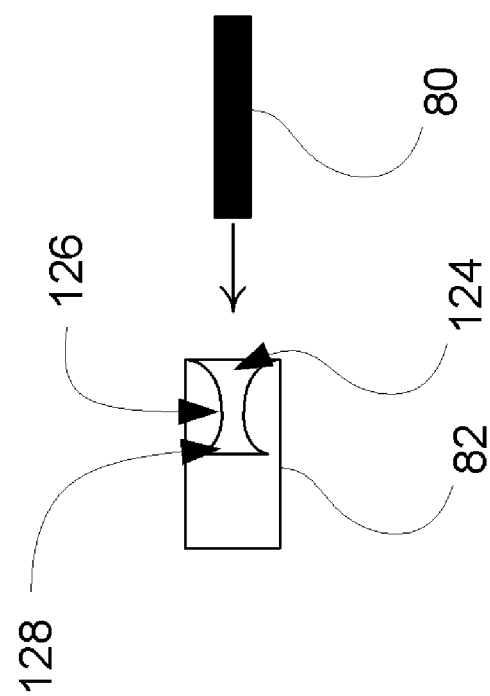

FIG. 10B illustrates one example of the fiber connector 82 of the luminaire 54. The illustrated example of the fiber connector 82 includes a conical opening 124 that extends from the distal end of the connector 82, narrows in a central portion 126 of the opening, and expands again in the proximal portion 128 of the connector 82. Compression of the connector 82 and/or the fiber 80, or cladding of the fiber 80, makes the fiber 80 difficult to remove because the proximal portion of the fiber 80, once inserted into the portion 268 of the connector 82, must pass through the constrained portion 126 to be removed.

Similar fiber connector mechanisms as discussed with reference the fiber connector 82 of the luminaire 54 in FIGS. 10A and 10B to may be used in the fiber connector 74 of the illuminator module 70.

It is to be recognized that the various embodiments of the illuminator modules 70 discussed with reference to FIGS. 7A-7F and FIGS. 8A-8C may be used in combination with any suitable electrical device disclosed herein. It is to be further recognized that the various embodiments of the luminaires 54 discussed with reference to FIGS. 9A-9C and FIGS. 10A-10B may be used in combination with any suitable electrical device or cover disclosed herein.

Figure 11:
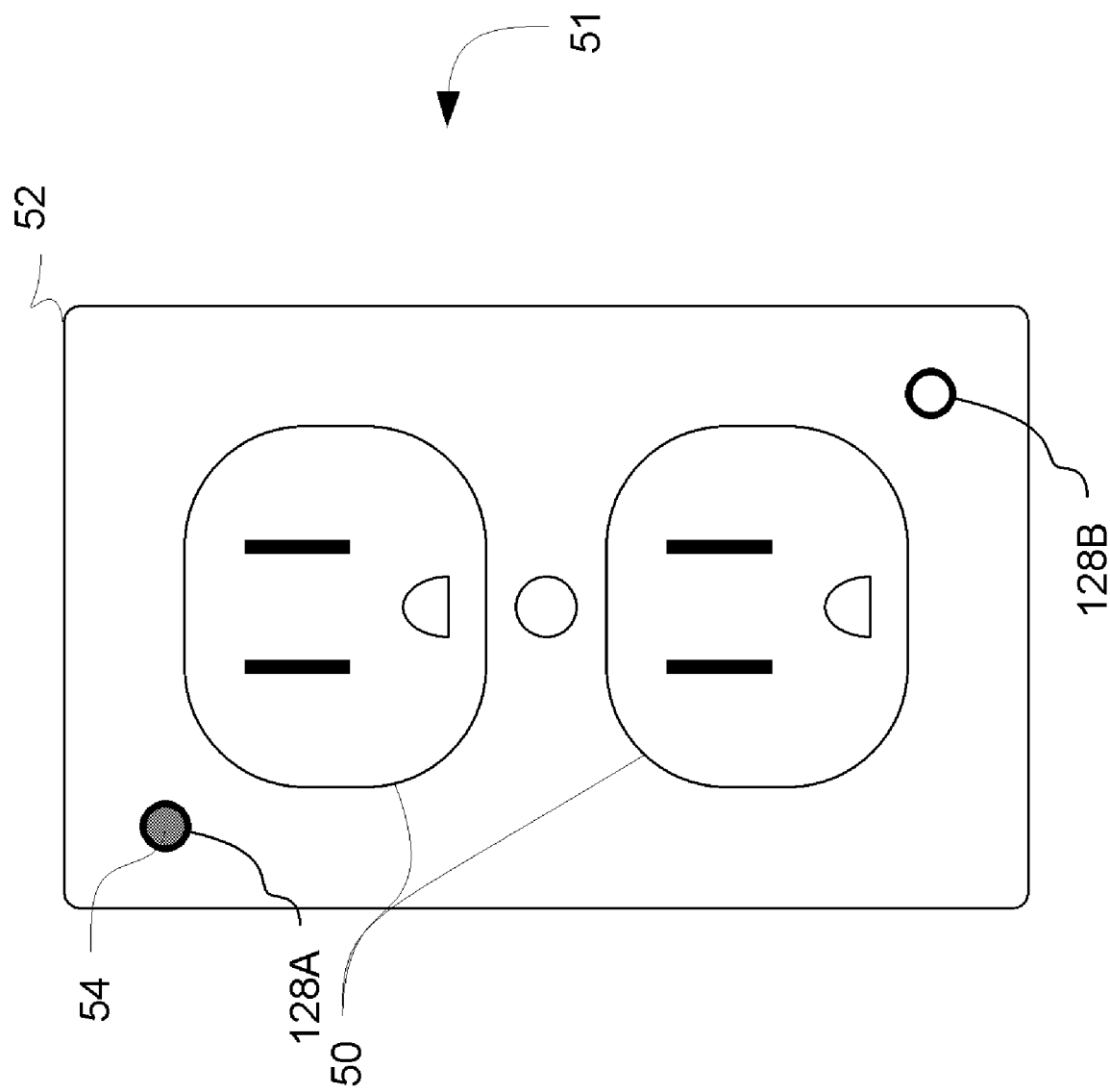
FIG. 11 illustrates another embodiment of an electrical receptacle and cover plate.

FIG. 11 illustrates another embodiment of the receptacle 51 that includes an example of the cover 52 having two openings 128A and 128B. As illustrated, one luminaire 5 has been positioned in the opening 128A while the opening 128B is empty. Desirably, such openings can be reconfigured to include examples of the luminaires 54 with different optical or operating properties as called for in a particular application. Desirably, these various luminaires 54 may be changed as desired or needed if the application changes without changing the electrical wiring of the connected electrical device, and, in many cases, merely by changing out the luminaire 54 and reconnecting the optical fiber.

FIG. 12A is a side view illustrating an embodiment that includes an off-the-shelf or standard receptacle 131 that is connected to an attachable module housing 132 that has the illuminator module 70 disposed within. In one embodiment, the housing 90 (See FIGS. 7A-7C) of the module 70 is disposed within the attachable module housing 132. The attachable module housing 132 is configured to be electrically and mechanically affixed to the electrical receptacle 131 via conductors 134 that connect to the electrical push-in connections (not shown) of the receptacle 131.

FIG. 12B is a rear cutaway view of the receptacle 131 and the attachable module housing 132 taken along the line B of FIG. 12A. The conductors 134 are positioned in one or more of the push-in style terminals 66, e.g., the push-in style terminals 66A.

Figure 12C:
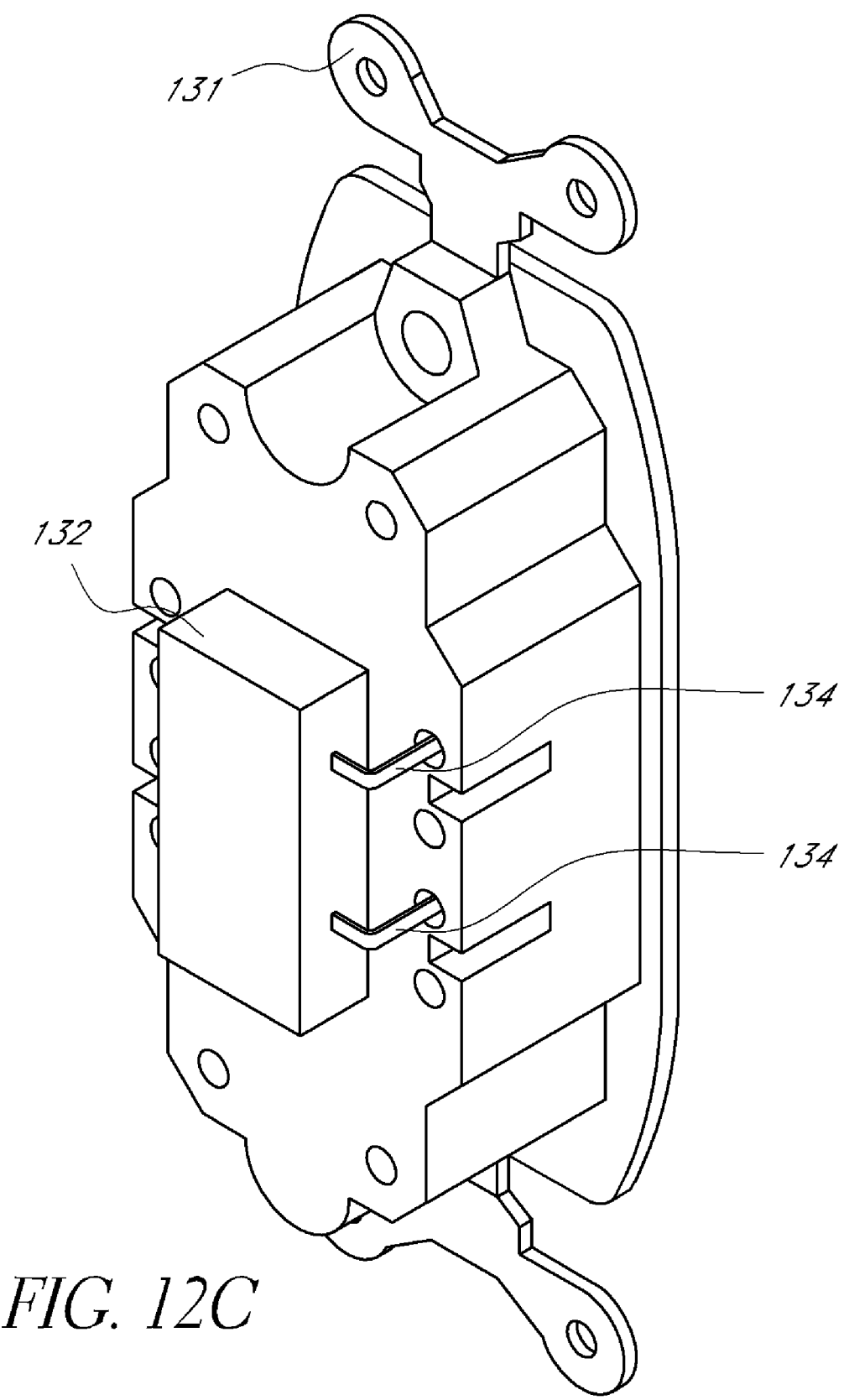
FIG. 12C is a rear perspective view of the receptacle illustrated by FIG. 12A.

FIG. 12C is a rear perspective view of the receptacle 131 and the attachable module housing 132 illustrating the conductors 134 connecting the module housing 132 to the receptacle 131. In the illustrated example of the attachable module housing 132, the housing 132 is connected to the receptacle 131 via four conductors 134. However, in other embodiments, other numbers of conductors 134, e.g., two, six, or eight, conductors 134 may, for example, be used.

Figure 13B:
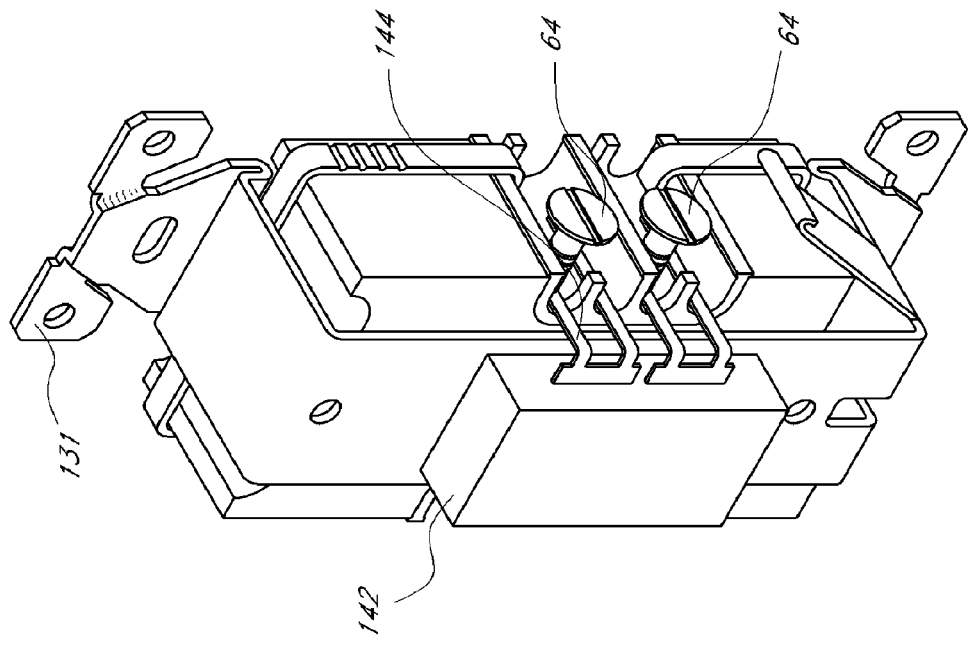
FIG. 13B is a rear perspective view of the receptacle of FIG. 13A.
Figure 13A:
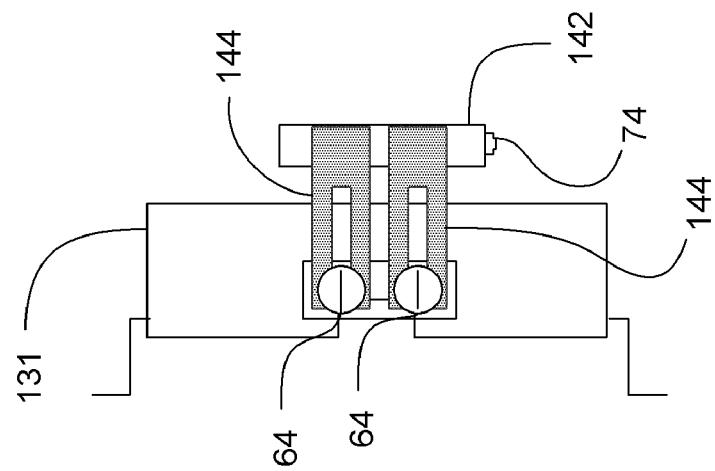
FIG. 13A is a side view illustrating an embodiment that includes another example of the off-the-shelf or standard receptacle that is connected to an attachable module.

FIG. 13A is a side view illustrating the off-the-shelf or standard receptacle 131 that can be connected to another example of the attachable module housing 142. The attachable housing module 142 comprises the illuminator module 70 disposed within. In one embodiment, the housing 90 (See FIGS. 7A-7C) of the module 70 is disposed within the attachable module housing 142. The attachable module housing 142 is configured to be electrically and mechanically affixed to the electrical receptacle 131 via conductors 144 that connect to the electrical screw-in connections 64 of the receptacle 131.

FIG. 13B is a rear perspective view of the receptacle 131 and the attachable module housing 142 illustrating the conductors 144 connecting the module housing 142 to the receptacle 131. In the illustrated example of the attachable module housing 142, the housing 142 is connected to the screw-in connectors 64 of the receptacle 131 via four conductors 144 (two on either side). However, in other embodiments, other numbers of conductors 144, e.g., two, six, or eight, conductors 144 may, for example, be used.

In use, an electrician or other installer installs electrical devices having integral illuminator modules 70 or attaches one or more illuminator modules 70 to each electrical device. Desirably, no further electrical connections need be made or run to the cover of the electrical device. In addition, the illuminator modules 70 may be configured to include easily attachable terminals or plugs, as those connections do not need to be run out of the interior of the electrical panel or other electrical box.

A suitable cover (or any other type of panel) 52 with integral luminaires 54 may be selected. Alternatively, a suitable cover 52 may have punch-outs removed from the cover 52 to provide openings for the luminaires 54 at desired locations. One or more luminaires 54 may then be attached to the cover 52.

Optical fibers 80 may then be inserted into the fiber connector(s) 74 of the illuminator modules 70 and into the fiber connectors 82 of the luminaires 54. The fibers 80 may be affixed to the fiber connectors 74 and 82 using retaining mechanisms of the fiber connectors 74 and 82 or affixed to the fiber connectors 74 and 82 using adhesives or any other suitable mechanism.

Thus, the luminaires 54 enables a reduced number electrical connections between the electrical devices and the cover 52. Desirably, in one embodiment the luminaires 54 may be changed out on the cover 52 without opening or affecting any electrical connections within the electrical device. Moreover, because the luminaires 54 are connected to the illuminator module 70 via a non-electrically conductive optical fiber, the luminaires 54 may be placed at locations that are not suitable for use with electrical wiring or connections due to environmental or safety issues.

FIG. 14A is a partial cutaway front view of another embodiment of an electrical outlet cover 152 in which the luminaires 54 are integrally formed within the cover 152. In this embodiment, the fiber connector 82 is configured to direct light to the optical output element 83 via a rear molded camber (not shown) integral with the cover 52.

FIG. 14B is a rear perspective view illustrating an example of a molded camber 154 of the rear surface of the cover 152 that directs light from fiber connector 82 to the light guide 84. In the illustrated example of FIG. 14B, the light guide 84 may comprise a prismatic or other light turning element. In one embodiment, a portion of the light received at the fiber connector 82 is reflected within the body of the cover 152 until it is scattered to produce a glow from all or a portion of the cover 152. The molded camber 154 of the rear surface has a depth D1 at a location 158 proximal to the luminaires 84 and a shallower depth D2 at a location 158 distal to the luminaires 84. The molded camber 154 enables the outlet cover 152 to be desirably formed of fewer parts and mold portions.

Figure 15B:
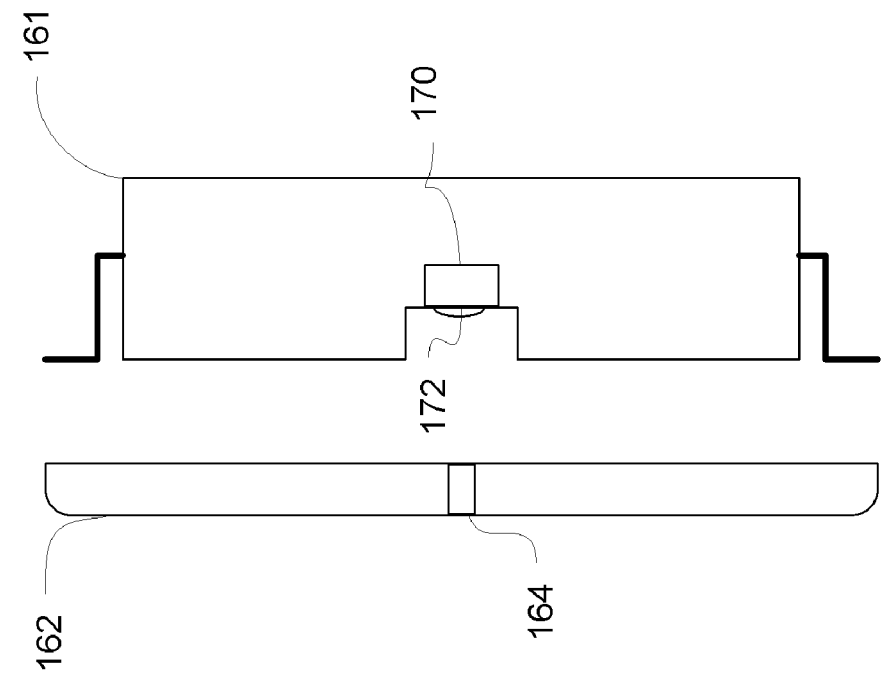
FIGS. 15A and 15B are a front and cross section views of another embodiment of a receptacle that uses optical alignment rather than an optical fiber to optically couple the illuminator with the luminare.
Figure 15A:
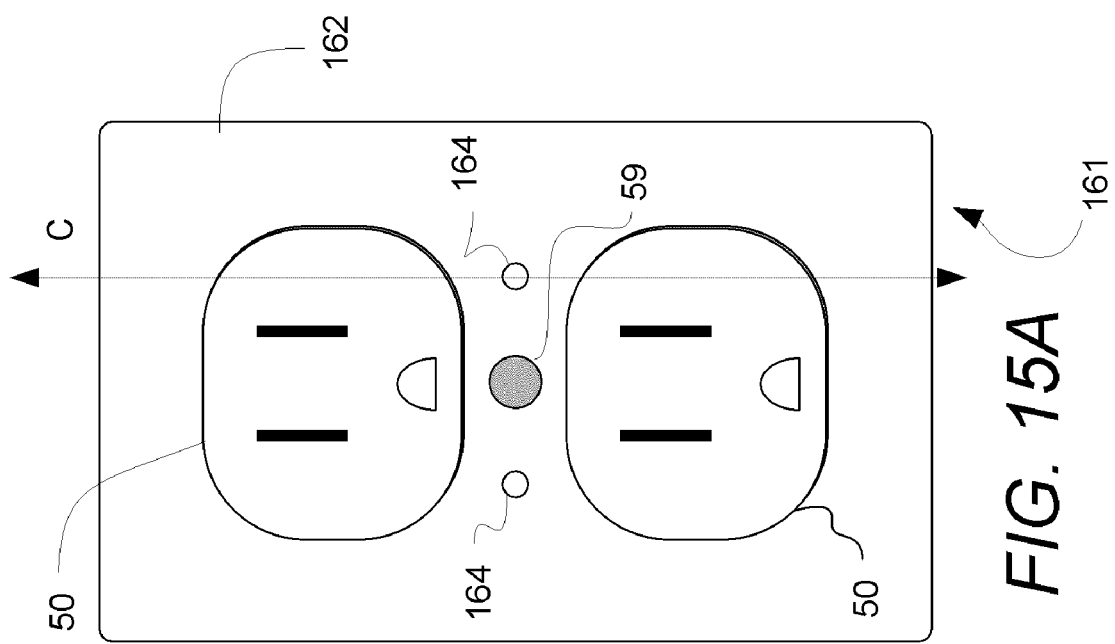

FIG. 15A is a front view of another embodiment of a receptacle 161. In the embodiment illustrated in FIG. 15A, the light source of the indicator module is coupled with a luminaire 164 of a cover 162 via air rather than an optical fiber. In the illustrated example, the cover 162 includes luminaires 54 that are positioned to receive light directed from a corresponding illuminator module 70 (not shown). In the illustrated example of the cover 162, the cover 162 includes two luminaires 164 positioned on opposing sides of the connector opening 59. In other embodiments, the cover 162 may include openings or punchouts through which the luminaires 164 may be attached to the cover 162.

FIG. 15B is a side cross section view of the receptacle 161 taken along line C of FIG. 15A. In the illustrated example, an indicator module 170 is integral with the body of the receptacle 161. The indicator module 170 may be embodied in a variety of configurations such as described with reference to the illuminator module 70 except without the fiber connector 74. In the illustrated embodiment, the indicator module 170 is positioned so as to be aligned with the luminaire 164 of the cover 162. An optical element 172 of the indicator module 170 may be configured to collimate or otherwise focus or direct the light from a light generator (not shown) to the luminaire 164.

FIG. 16A is a side view an example of an electrical circuit breaker 200 in which the indicator module (not shown) is integral with a housing 202 of the breaker 200. In the illustrated embodiment, the indicator module is housed within a protruding portion 208 of the housing 202. The fiber connector 74 of the indicator module is positioned on a lower, generally downward facing, surface 209 of the protruding portion 208. The breaker 200 includes a switch 204 for switching the state of the breaker, and electrical terminals 216, which further comprise a wire or conductor 217 extending from the terminal 216. The breaker 200 also includes a neutral terminal 218 that also comprises a wire or conductor 219 extending form the terminal 218. The indicator module may be configured for use with an electrical panel or cover (not shown). In one embodiment, the electrical circuit breaker 202 comprises an electrical switch for a light or other electrical circuit. In one embodiment, the illuminator module 70 is configured to indicate the status of a three way (e.g., a circuit with two switches), or other multi-way, electrical circuit. In one embodiment, the illuminator module could be configured to indicate the presence of electrical power, the presence of an electrical short-circuit, the open, closed, tripped, or other state of the breaker, or a combination of one or more conditions. Various embodiments might represent multiple states or conditions through the variation of color, of cadence (flashing), or a combination of effects.

FIG. 16B is a front view of the breaker 200 of FIG. 16A that illustrates the location of the switch 204. FIG. 16C is rear perspective of the example of the breaker 200 of FIG. 16A further illustrating the breaker 200. As illustrated in FIG. 16C, the fiber connector 74 is positioned on the generally downward facing surface 209 of the protruding portion 208 that meets the rear of the housing 202 at about a 45° angle. The optical fiber (not shown) can thus be attached from below, which may be desirable in some cramped electrical boxes where the breaker 200 may be used.

FIG. 17A is a side view illustrating another embodiment of a breaker 220. The embodiment illustrated in FIG. 17A is similar to that of FIG. 16A except that the illuminator module is disposed within a housing 222 of the breaker 220 rather than in the protruding portion 208 of the breaker 200. In addition, the fiber connector 74 is positioned on the rear surface of the housing 222 facing to the rear along with the terminals 216 and 218. FIG. 17B is a rear perspective view further illustrating the location of the fiber connector 74 on the breaker 220.

Breakers 220 with protruding portions 208 such as illustrated in FIG. 16A may be desirable where the protruding portion 208 allows the fiber to be received from top or bottom, or when more space is required for the components of the illuminator module 70 than easily fits within the body of the breaker 240. Breakers 220 with flush mounted fiber connectors 74 may be desirable where routing the fiber directly from the rear of the breaker 220 is most convenient or desirable.

FIG. 18A is a side cutaway view of an example of an off-the-shelf, or other conventional electrical breaker 230 and an example of an attachable indicator module 240. The attachable module 240 is configured to be attached to a housing 232 of the electrical breaker 230. The breaker 230 includes the switch 204 for switching the state of the breaker and electrical terminals 216, which further comprise a wire or conductor 217 extending from the terminal 216. The attachable module 240 includes the illuminator module 70 disposed within the module 240. The attachable module 240 further comprises one or more electrical terminals 246 that are electrically connected to the electrical components 78 of the illuminator module 70. In the example indicator module of FIG. 18A, the fiber connector 74 is positioned at the short or top end of the indicator module 78 and configured to receive light from one or more light generators 72. The attachable module 240 may include any embodiment of the illuminator module 70 disclosed herein. In the illustrated example, the attachable module 240 may also comprise the neutral terminal 218 and neutral terminal conductor 219. As illustrated in FIG. 18A, the terminals 246 of the attachable module 240 comprise recesses 242 and 243 that are sized and positioned to receive the terminals 216 of the breaker 230. The attachable module 240 may thus be easily and conveniently attached to the breaker 230.

FIG. 18B is a side cross-section view of the breaker 230 and the attachable indicator module 240 of FIG. 18A in which the module 240 has been attached to the breaker 230. The connectors 216 may be press fit into the recesses 242. The recesses 242 may also be sized slightly smaller than the connectors 216 and formed of a compressible material to further attach the module 240 to the breaker 230. In addition, or alternatively, the sides of the recess 242 may include spring or barbed retaining mechanisms to attach the module 240 to the breaker 230. Further, adhesives may be placed on the non-conductive portions of the recess to further attach the module 240 to the breaker 230. As further illustrated, the conductor 217 of the terminals 216 may extend through the terminals 246 into the recesses 243. In some configurations of breakers, the electrical connector 216 is threaded, and the attachment of conducting wires or terminals with a threaded nut or similar fastener may further serve to attach the module to the breaker mechanically, electrically, or a combination of both.

Attachable examples of the module 240 may also, or in addition, be secured to electrical devices using conductive strips (not shown) extending from the module 240 and which are shaped to fit the terminals such as the terminals 216 of the breaker 230. Such strips may further include spade plugs or other shapes suitable for connection to electrical terminals. For example, one example of attachable indicator modules 240 includes conductive pins extending from the module 240 configured to fit into push-in style electrical connectors such as the push-in connectors 66 on the rear of the electrical outlet housing 60 illustrated in FIG. 3A.

FIG. 19A is a rear perspective view of the module 240 and the breaker 230 substantially aligned for mating. In this view, the rear recesses 243 for receiving the conductors 217 are illustrated. FIG. 19B is a front perspective view of the module 240 illustrating the recesses 240 that are adapted to receive the terminals 216 of the breaker 230.

Figure 20:
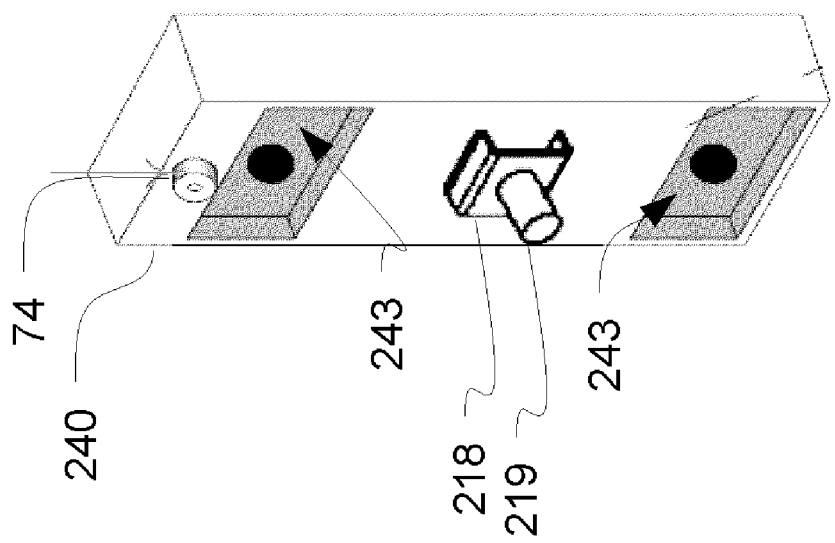
FIG. 20 is a side view of another example of the attachable indicator module similar to that illustrated with reference to FIG. 19A except with a different fiber connector configuration.

FIG. 20 is a side view of another example of the attachable indicator module 240 similar to that of FIG. 19A except having the fiber connector 74 extending from the rear surface of the module 240 instead of the top or other end surface of the module 70. This module 240 may be used in panels that have space at the back for the optical fiber rather than on top, e.g., such as in commercial or industrial breaker panels that have breakers 230 positioned one atop another, but open in back.

As noted herein, embodiments of the disclosed indicator modules and luminaires may be further configured to communicate data regarding the status of the associated electrical systems to a computing device such as a system monitoring and/or control computer or to personal computing devices such as laptop computers, personal digital assistants, mobile telephones, or any other suitable electronic device.

For example, embodiments may be configured to measure and record electrical line and load data, and provide a way of transmitting and receiving electrical line and load data. Electrical power distribution exists throughout industrial, office, and residential applications. Traditionally, metering and measurement of the nature of electrical supplies (including but not limited to electrical voltage and frequency) and connected loads (including but not limited to current flow, power consumption, load factor, and load nonlinearity) is done at a central metering point for billing purposes. Such information may lack detail to be used for the purposes of optimizing electrical usage; information is required on a more detailed basis, and in heavy power-consuming industries, equipment is periodically monitored and inspected with special power measurement equipment to optimize electrical usage. Due to the expense and difficulty of incorporating such instrumentation into the electrical power distribution system, continuous measurement is often limited to a single floor or a single piece of equipment of sufficient return-on-investment. Desirably, according to one embodiment, suitable modules and luminaires may be used to communicate such usage data.

Poorly optimized electrical systems may consume excessive monetary and generative resources, and may further contribute to globally sensitive problems such as environmental warming. Thus, a way of conveniently and inexpensively obtaining, transmitting, and manipulating electrical line and load data down to individual loads (e.g. a single wall outlet in an office or home, or an individual circuit breaker in a factory) has become highly desirable in all environments—industrial, office, and home. Several embodiments of the remotely-located indicator lamp module discussed herein may include suitable electronics and additional capabilities to provide such detailed electrical measurement activities. As noted above, fully-insulated illuminator modules may be configured to fit into many conventional electrical outlet and junction box systems, as well as inside of electrical control panels and in manufactured electrical equipment. Embodiments of such modules may be inexpensively tied-into conventional wiring because electrical connections include lead wires familiar to electrical installers, and because some embodiments are fully-insulated, do not require special mounting provisions.

In addition, electrical wiring device 'piggyback' modules such as illustrated in FIGS. 13A and 18A may be configured to fit into conventional electrical outlet boxes of existing and new construction and/or into conventional electrical power distribution panels and load centers of both existing and new construction. It is to be recognized that any of the embodiments disclosed herein may be configured to communicate usage data via suitable optical protocols. Desirably, such systems and methods of transmitting electrical measurement data using optical protocols may avoid problems associated with wireless RF protocols that exist in many applications due to electrical noise.

In view of the above, one will appreciate that the invention overcomes the problem of providing indicators for electrical panels that desirably separate the electrical components from the visible optical output components so as to reduce complexity, cost, and/or installation labor for such indicators.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. An apparatus for indicating status of an electrical device, the apparatus comprising:
    a housing configured to be attached to an electrical device;
    an electrical input disposed on the housing and configured to receive an electrical signal;
    a first connector disposed on the housing and configured to receive a proximal end of an optical fiber;
    a lighting element disposed in the housing and configured to output light in response to the electrical signal;
    an optical element disposed in the housing and configured to transmit at least a portion of the output light to the optical fiber;
    a second connector configured to receive a distal end of the optical fiber; and
    an optical output element positioned relative to the second connector so as to receive light from the distal end of the optical fiber, said optical output element configured to be attached to a panel and configured to output light received from the optical fiber.

2. The apparatus of claim 1, wherein the housing is integrally formed with at least part of the electrical device.

3. The apparatus of claim 1, wherein the housing comprises an electrical insulator.

4. The apparatus of claim 1, wherein the housing comprises an environmental seal.

5. The apparatus of claim 1, wherein the electrical input of the housing is configured to be attached to an electrical terminal of the electrical device.

6. The apparatus of claim 1, further comprising a control circuit configured to modulate output of the lighting element in response to the electrical signal.

7. The apparatus of claim 6, wherein the control circuit is configured to modulate the light to communicate measurement data indicative of the electrical signal.

8. The apparatus of claim 1, wherein at least one of the second connector and the optical output element are integrally formed on the panel.

9. The apparatus of claim 1, wherein the optical output element is configured to interchangeably attach to the cover of the electrical device.

10. The apparatus of claim 1, wherein the electrical device comprises at least one of a circuit breaker, an electric outlet, an electric switch, a network connector, a computer peripheral connector, and an audio-visual connector.

11. The apparatus of claim 1, further comprising a light guide operatively connected to the second connector and configured to at least partially transmit light from the optical fiber to the optical output element.

12. The apparatus of claim 11, wherein the optical output element has an optical axis and wherein the second connector is configured to receive the optical fiber at an angle to the optical axis of about 90 degrees.

13. The apparatus of claim 11, wherein the optical output element has an optical axis and wherein the second connector is configured to receive the optical fiber at an angle to the optical axis of between 10 and 80 degrees.

14. The apparatus of claim 11, wherein at least one of the first and second connectors comprises a fiber capture device.

15. An apparatus for indicating status of an electrical device, the apparatus comprising:
    a housing having means for attachment to an electrical device;
    means disposed on the housing for receiving an electrical signal;
    means disposed on the housing for receiving a proximal end of an optical fiber;
    means disposed in the housing for outputting light in response to the electrical signal
    means disposed in the housing for receiving at least a portion of the output light and transmitting at least a portion of the received light to the optical fiber;
    means for receiving a distal end of the optical fiber; and
    means for receiving at least a portion of the light transmitted to the optical fiber and outputting at least a portion of the received light, wherein said means for receiving at least a portion of the light transmitted to the optical fiber and outputting at least a portion of the received light is configured to be attached to a panel.

16. The apparatus of claim 15, further comprising means for modulating output of the lighting element in response to the electrical signal.

17. The apparatus of claim 15, wherein the means for receiving an electrical signal is configured to be attached to an electrical terminal of the electrical device.

18. An apparatus for indicating status of an electrical device, the apparatus comprising:
    a housing configured to be attached to an electrical device;
    an electrical input disposed on the housing and configured to receive an electrical signal;
    a lighting element disposed in the housing and configured to output light in response to the electrical signal;
    an optical element disposed in the housing; and
    an optical output element configured to be attached to a panel,
    wherein the optical element is configured to transmit at least a portion of the output light to the optical output element and wherein the optical output element is configured to output light received from the optical element.

19. A method of indicating status of an electrical device, the method comprising:
- connecting a housing to an electrical device;
- electrically connecting the housing to an electrical signal;
- electrically connecting the electrical signal to a light generator;
- connecting a proximal end of an optical fiber to a first connector disposed upon the housing;
- disposing an optical element between the light generator and the proximal end of the optical fiber such that the optical element directs light into the proximal end of the optical fiber;
- connecting a second connector to a panel;
- connecting a distal end of the optical fiber to the second connector; and
- disposing an optical output element between the distal end of the optical fiber and the panel such that the optical output element directs light out from the panel.

20. The method of claim 19, further comprising:
- electrically connecting an electrical component to the electrical signal and the light generator so as to modulate the light generator.

* * * * *